(12) United States Patent
Ohwatari et al.

(10) Patent No.: US 10,009,879 B2
(45) Date of Patent: *Jun. 26, 2018

(54) USER EQUIPMENT

(71) Applicant: NTT DOCOMO, INC., Tokyo (JP)

(72) Inventors: Yusuke Ohwatari, Tokyo (JP); Kazuaki Takeda, Tokyo (JP); Yousuke Sano, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/325,345

(22) PCT Filed: Jul. 14, 2015

(86) PCT No.: PCT/JP2015/070209
§ 371 (c)(1),
(2) Date: Jan. 10, 2017

(87) PCT Pub. No.: WO2016/013458
PCT Pub. Date: Jan. 28, 2016

(65) Prior Publication Data
US 2017/0164346 A1    Jun. 8, 2017

(30) Foreign Application Priority Data
Jul. 22, 2014    (JP) ................... 2014-148469

(51) Int. Cl.
*H04W 72/04* (2009.01)
*H04W 4/18* (2009.01)
(Continued)

(52) U.S. Cl.
CPC ......... *H04W 72/0406* (2013.01); *H04W 4/18* (2013.01); *H04W 72/0466* (2013.01); *H04W 74/008* (2013.01); *H04W 99/00* (2013.01)

(58) Field of Classification Search
CPC ............... H04W 72/0406; H04W 4/18; H04W 72/0466; H04W 74/008; H04W 99/00
See application file for complete search history.

(56) References Cited

U.S. PATENT DOCUMENTS

| 2014/0169313 A1* | 6/2014 | Yang | ..................... H04W 72/02 370/329 |
| 2014/0307695 A1* | 10/2014 | Yang | ........................ H04L 1/18 370/329 |

(Continued)

FOREIGN PATENT DOCUMENTS

JP    2013-009290 A    1/2013

OTHER PUBLICATIONS

Saito et al. (Saito hereafter) (Non-Orthogonal Multiple Access (NOMA) for Cellular Future Radio Access, 2013 IEEE 77th).*

(Continued)

*Primary Examiner* — Alex Skripnikov
*Assistant Examiner* — Sharmin Chowdhury
(74) *Attorney, Agent, or Firm* — Osha Liang LLP

(57) ABSTRACT

From a base station, a user equipment receives a mixed data signal transmitted in a format in which multiple data signals are transmitted with different downlink transmission powers such that the multiple data signals are not orthogonal to each other, multiple control signals corresponding to multiple user equipments, and information indicating an identifier of another user equipment. The user equipment determines an aggregation level of the subject user equipment. The user equipment uses the identifier of the other user equipment to attempt descrambling of one control signal among multiple control signals corresponding to an aggregation level higher than or equal to the aggregation level of the user equipment, (Continued)

and if the descrambling is successful, the user equipment uses the control signal to demodulate the non-orthogonal data signal.

6 Claims, 13 Drawing Sheets

(51) Int. Cl.
*H04W 74/00* (2009.01)
*H04W 99/00* (2009.01)

(56) References Cited

U.S. PATENT DOCUMENTS

2014/0314006 A1* 10/2014 Suh .................. H04B 7/0452
370/329
2015/0043466 A1* 2/2015 Yoshida ............. H04W 16/28
370/329

OTHER PUBLICATIONS

Extended European Search Report issued in the counterpart European Patent Application No. 158250845, dated Jun. 16, 2017 (7 pages).
International Search Report issued in PCT/JP2015/070209, dated Sep. 15, 2015 (1 page).
Written Opinion of the International Searching Authority issued in PCT/JP2015/070209, dated Sep. 15, 2015 (3 pages).
3GPP TR 36.866 V12.0.1; "3rd Generation Partnership Project; Technical Specification Group Radio Access Network; Study on Network-Assisted Interference Cancellation and Suppression (NAIC) for LTE (Release 12)"; Mar. 2014 (64 pages).
Manchon, C.N. et al.; "On the Design of a MIMO-SIC Receiver for LTE Downlink"; Vehicular Technology Conference, Sep. 21-24, 2008, VTC 2008-Fall, IEEE 68th (8 pages).
3GPP TS 36.212 V11.4.0; "3rd Generation Partnership Project; Technical Specification Group Radio Access Network; Evolved Universal Terrestrial Radio Access (E-UTRA); Multiplexing and channel coding (Release 11)"; Dec. 2013 (84 pages).

* cited by examiner

FIG.5
PRIOR ART

| INFORMATION ELEMENT | CWIC | SLIC | ML | NOTES |
|---|---|---|---|---|
| CARRIER INDICATOR | NOT REQUIRED | NOT REQUIRED | NOT REQUIRED | |
| RESOURCE ALLOCATION HEADER | SEE NOTE | SEE NOTE | SEE NOTE | REQUIRED IN PRINCIPLE BUT NOT REQUIRED WHEN SAME RESOURCES AS THOSE ALLOCATED TO UE WITH CANCELLER ARE ALLOCATED TO INTERFERING UE |
| RESOUCE BLOCK ASSIGNMENT | SEE NOTE | SEE NOTE | SEE NOTE | |
| DOWNLINK ASSIGNMENT INDEX | NOT REQUIRED | NOT REQUIRED | NOT REQUIRED | |
| TPC COMMAND FOR PUCCH | NOT REQUIRED | NOT REQUIRED | NOT REQUIRED | |
| HARQ PROCESS NUMBER | NOT REQUIRED | NOT REQUIRED | NOT REQUIRED | |
| SCRAMBLING IDENTITY, RANK INDICATOR, DM-RS PORT | REQUIRED | REQUIRED | REQUIRED | |
| SRS REQUEST | NOT REQUIRED | NOT REQUIRED | NOT REQUIRED | |
| MODULATION AND CODING SCHEME | REQUIRED | SEE NOTE | SEE NOTE | ONLY MODULATION INFORMATION IS REQUIRED |
| NEW DATA INDICATOR | REQUIRED | NOT REQUIRED | NOT REQUIRED | |
| REDUNDANCY VERSION | REQUIRED | NOT REQUIRED | NOT REQUIRED | |
| HARQ-ACK RESOURCE OFFSET | NOT REQUIRED | NOT REQUIRED | NOT REQUIRED | |
| PDSCH RE MAPPING AND QUASI-CO-LOCATION INDICATOR | NOT REQUIRED | NOT REQUIRED | NOT REQUIRED | |
| LOCALIZED/DISTRIBUTED VRB ASSIGNMENT FLAG | SEE NOTE | SEE NOTE | SEE NOTE | REQUIRED IN PRINCIPLE BUT NOT REQUIRED WHEN SAME RESOURCES AS THOSE ALLOCATED TO UE WITH CANCELLER ARE ALLOCATED TO INTERFERING UE |
| TRANSPORT BLOCK TO CODEWORD SWAP FLAG | REQUIRED | REQUIRED | REQUIRED | |
| PRECODING INFORMATION | REQUIRED | REQUIRED | REQUIRED | |

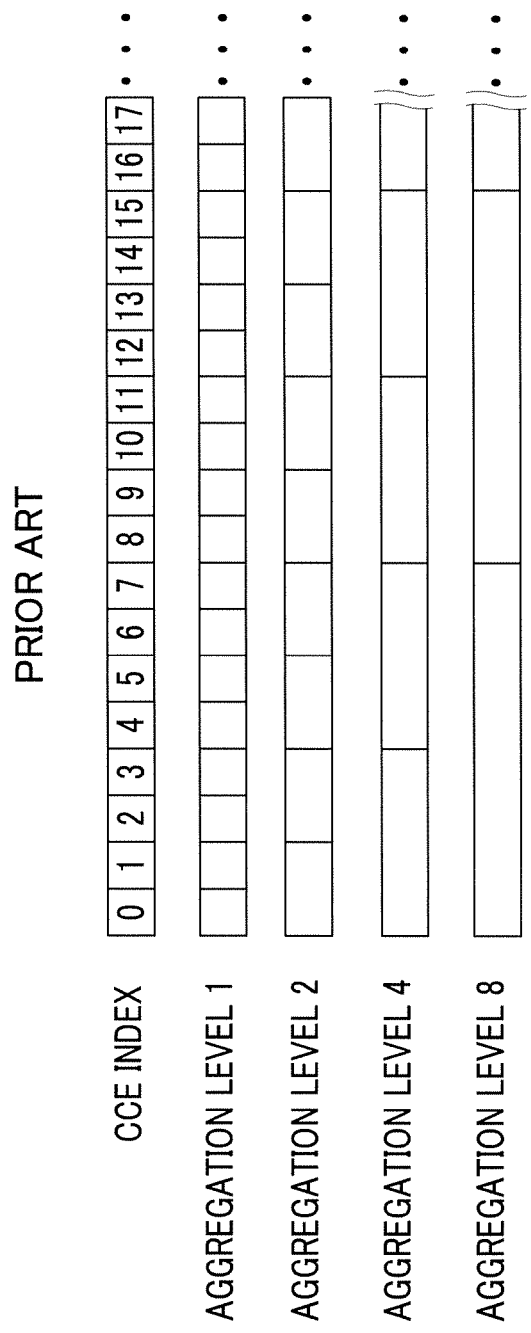

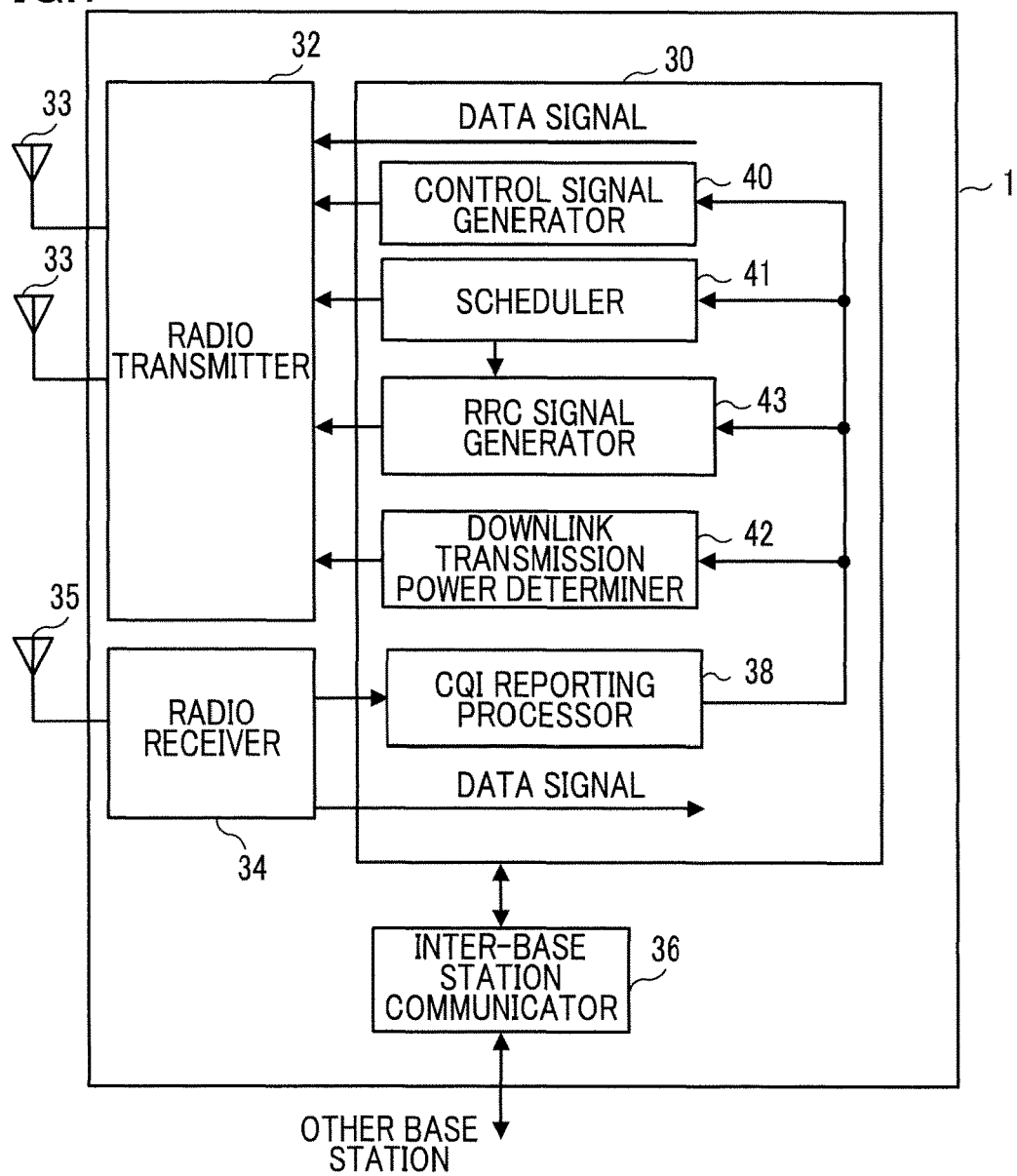

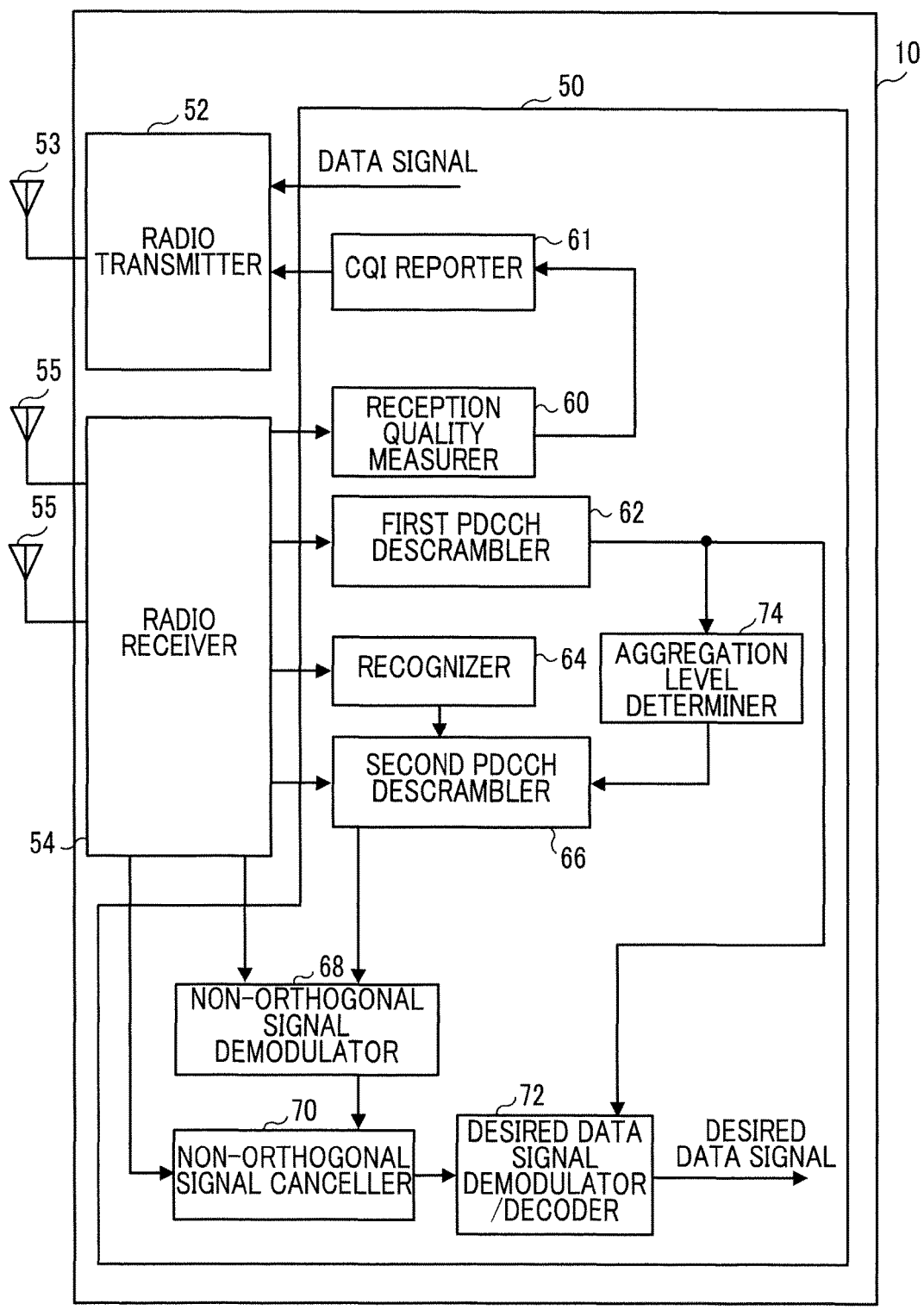

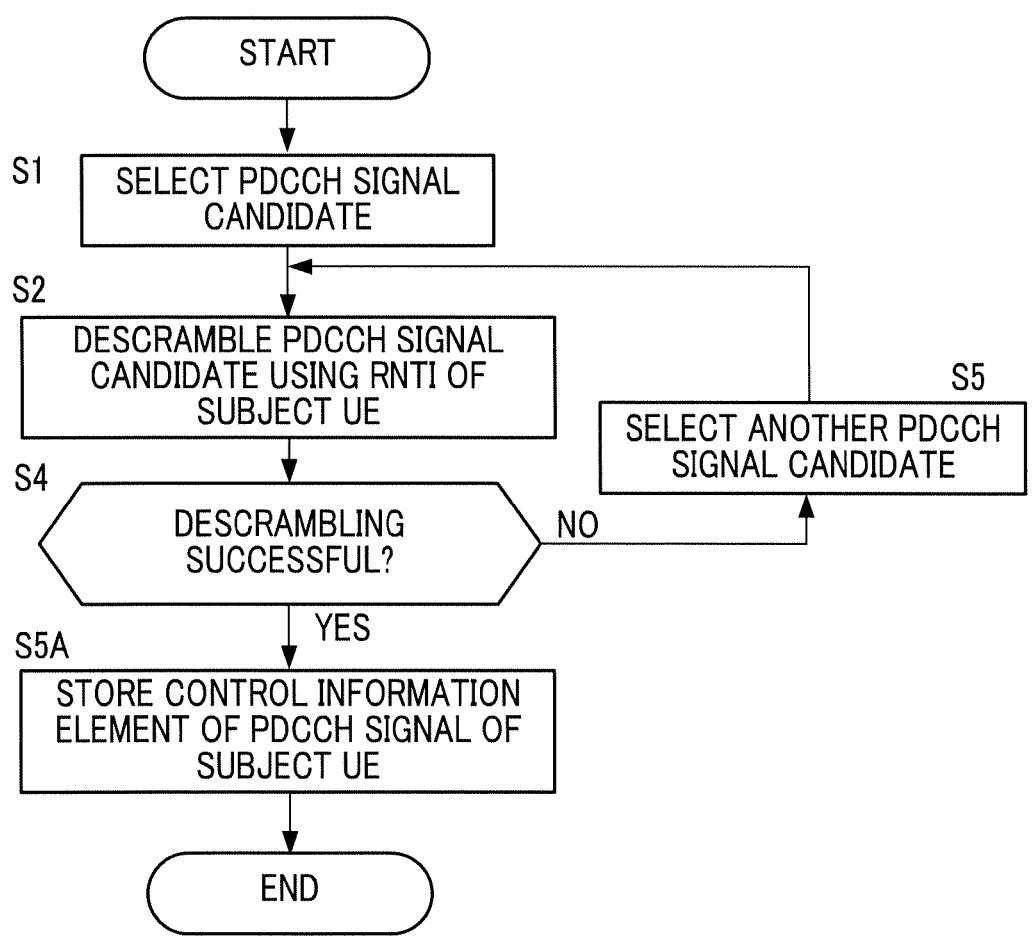

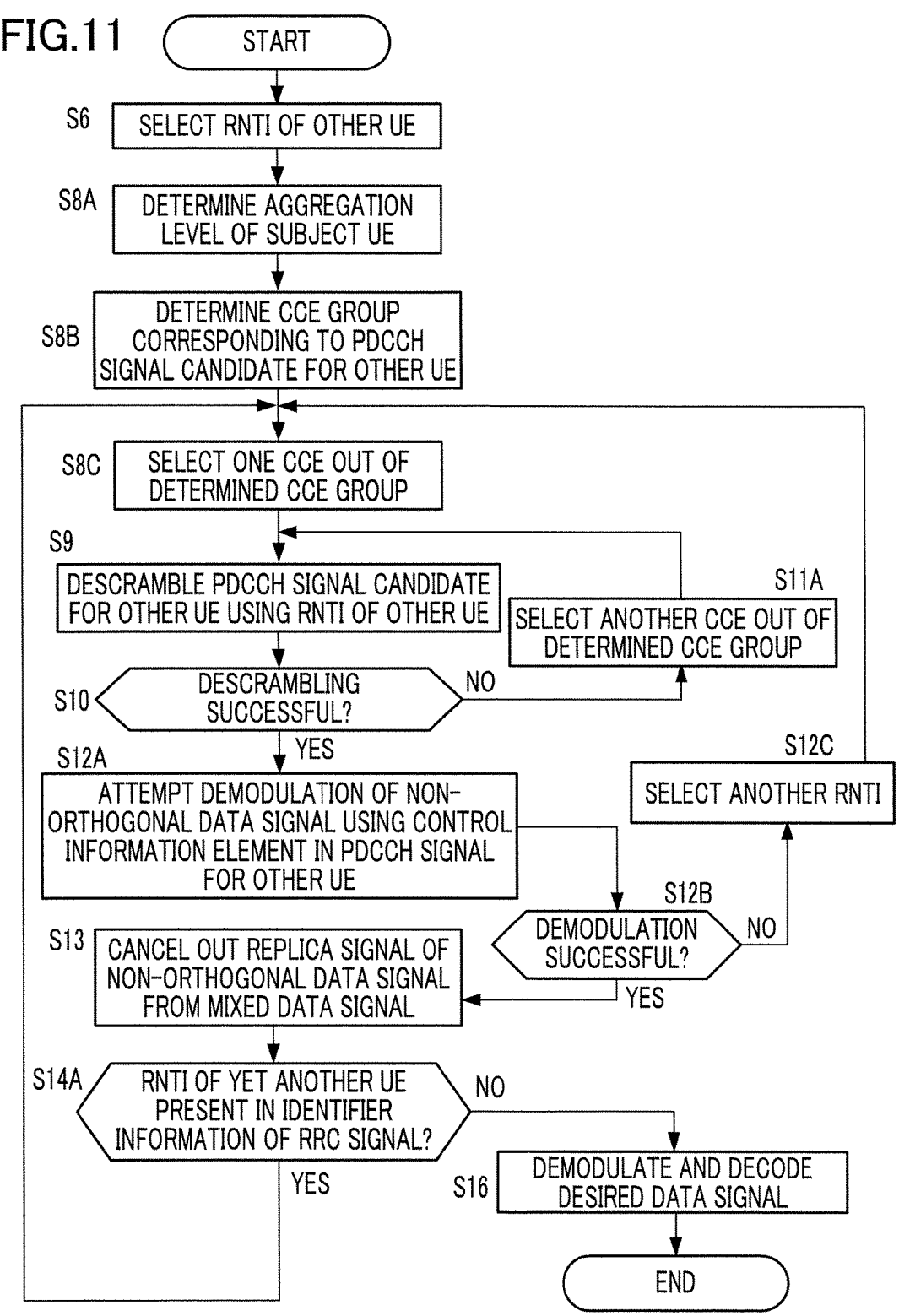

FIG.16

| INDEX | RNTI |
|-------|------|
| 00    | 0123 |
| 01    | flab |
| 10    | ffff |
| 11    | 85bd |

⋮

USER EQUIPMENT

TECHNICAL FIELD

The present invention relates to a user equipment.

BACKGROUND ART

Orthogonal multiple access, in which multiple signals do not interfere with each other, is widely used in communication between a base station and user equipments (e.g., mobile stations) in a mobile communication network. With orthogonal multiple access, different radio resources are allocated to different user equipments. CDMA (code division multiple access), TDMA (time division multiple access), and OFDMA (orthogonal frequency division multiple access) are examples of orthogonal multiple access. For example, in Long Term Evolution (LTE) standardized by the 3GPP, OFDMA is used in downlink communication. With OFDMA, different frequencies are allocated to different user equipments.

In recent years, non-orthogonal multiple access (NOMA) has been proposed as a method for communication between a base station and user equipments (e.g., see Patent Document 1). With non-orthogonal multiple access, the same radio resources are allocated to different user equipments. More specifically, a single frequency is allocated to different user equipments simultaneously. In applying non-orthogonal multiple access to downlink communication, a base station transmits a signal with a large transmission power to a user equipment (generally a user equipment at a cell area edge) with a large path loss, that is, a user equipment with a small reception SINR (signal-to-interference-plus-noise-power ratio), and the base station transmits a signal with a small transmission power to a user equipment (generally, a user equipment at the center of a cell area) with a small path loss, that is, a user equipment with a large reception SINR. Accordingly, the signal received by each user equipment is influenced by interference caused by signals addressed to other user equipments.

In this case, each user equipment demodulates the signal addressed to that user equipment using a power difference. Specifically, each user equipment first demodulates the signal with the highest reception power. Because this demodulated signal is a signal addressed to a user equipment that is the closest to the cell area edge (or more accurately, the user equipment with the lowest reception SINR), the user equipment closest to the cell area edge (the user equipment with the lowest reception SINR) ends demodulation. Each of the other user equipments cancels out the interference component, which amounts to that demodulated signal, in the received signals using interference cancellers, and demodulates the signal with the second-highest reception power. Because this demodulated signal is the signal addressed to a user equipment that is the second-closest to the cell area edge (or more accurately, the user equipment with the second-lowest reception SINR), the user equipment that is the second-closest to the cell area edge (has the second-lowest reception SINR) ends modulation. By thus repeating the demodulation and canceling out of signals with high power, all of the user equipments can demodulate the signals addressed to them.

By combining non-orthogonal multiple access with orthogonal multiple access, it is possible to increase the capacity of the mobile communication network in comparison to using orthogonal multiple access alone. That is, in the case of using orthogonal multiple access alone, it is not possible to allocate a certain radio resource (e.g., a frequency) to multiple user equipments for the same duration, but in the case of combining non-orthogonal multiple access and orthogonal multiple access, a certain radio resource can be allocated to multiple user equipments for the same duration.

The following three interference cancellers are representative candidates to be used in NOMA (Non-Patent Document 1).

Symbol-level Interference Canceller (SLIC)

This handles interference signals at the symbol level (i.e., for each RE (resource element)) and cancels out the demodulation result of the interference signal.

Codeword-level IC (CWIC)

This is also referred to as a Turbo SIC (Successive Interference Canceller) or Codeword SIC, decodes the interference signal at the codeword level and cancels out the decoding result. For example, Non-Patent Document 2 discloses a Codeword SIC.

Maximum Likelihood (ML)

This jointly estimates desired signals and the interference signals at the symbol level (i.e., for each RE (resource element)).

In order to improve the performance of NOMA, a receiver having a highly-accurate interference canceller is desirable, and therefore application of CWIC is desirable. However, in order to improve the accuracy of the interference canceller, the amount of required information on the interference signal increases. With CWIC, the result of decoding the interference signal is canceled out, and therefore there are more types of required information elements for the interference signal than with other interference cancellers. Section 7.5 of Non-Patent Document 1 discloses information that is needed in CWIC. Also, since other interference cancellers also cancel out the result of demodulating an interference signal, various types of information are needed in order to demodulate the interference signal.

Here, an interference signal is a data signal that gives interference to the desired data signal of a user equipment, with the data signal giving interference being addressed to another user equipment. In LTE, demodulation or decoding of a data signal requires information included in a control signal corresponding to a user equipment that is the destination of that data signal. Accordingly, the interference canceller needs to decrypt a control signal corresponding to another user equipment.

Patent Document 1 discloses various methods according to which a mobile station recognizes control information of another mobile station in a radio communication system using non-orthogonal multiple access.

RELATED ART DOCUMENT

Patent Documents

Patent Document 1: Japanese Patent Application Laid-Open Publication No. 2013-009290

Non-Patent Documents

Non-Patent Document 1: 3GPP TR 36.866 V12.0.1 (2014-03), 3rd Generation Partnership Project; Technical Specification Group Radio Access Network; Study on Network-Assisted Interference Cancellation and Suppression (NAIC) for LTE (Release 12), March 2014

Non-Patent Document 2: Manchon, C. N., et al, "On the Design of a MIMO-SIC Receiver for LTE Downlink", Vehicular Technology Conference, 2008 VTC 2008-Fall. IEEE 68th

SUMMARY OF INVENTION

Problem to be Solved by the Invention

FIG. 9 of Patent Document 1 discloses that a control signal for a user includes information for demodulating a control signal for another user. Specifically, the information for demodulating the control signal for the other user includes a UE ID and information indicating the position of a radio resource block (e.g., a Control Channel Element (CCE) index, etc.). However, because the amount of information that can be transmitted with the control signals of the users is limited, it may be difficult to transmit information indicating the position of a radio resource block for demodulating the control signal for the other user. Also, the communication efficiency is hindered by not only the transmission of the control signal, but also by transmitting information indicating the positions of radio resource blocks for the control signals of many users.

However, there are many candidates for radio resources by which the control signals are transmitted. For this reason, in the case of not knowing the radio resource by which the control signal corresponding to the address of the interfering data signal to be canceled out is transmitted, the user equipment needs to check many control signals using trial and error (blind decoding) to find out which control signal is the control signal corresponding to the destination of the interfering data signal. The blind decoding requires an enormous amount of processing.

In view of this, the present invention provides, in a non-orthogonal multiple access radio communication system, a user equipment with reduced processing for searching for a control signal corresponding to a destination of an interfering data signal to be canceled out.

Means of Solving the Problems

A user equipment according to a first aspect of the present invention includes: a radio receiver configured to receive, from a base station, a mixed data signal transmitted in a format in which a plurality of data signals addressed to a plurality of user equipments in a group are transmitted using different downlink transmission powers such that the plurality of data signals are not orthogonal to each other and in which a plurality of data signals addressed to a plurality of user equipments in another group are transmitted using different downlink transmission powers such that the plurality of data signals are not orthogonal to each other, a plurality of control signals corresponding to the plurality of user equipments, and information indicating an identifier of at least one other user equipment, of the plurality of user equipments, that belongs to at least the group to which the subject user equipment belongs; a first descrambler configured to descramble a control signal for the subject user equipment using an identifier of the subject user equipment; a recognizer configured to recognize the identifier of the at least one other user equipment, to which at least one non-orthogonal data signal is addressed, the at least one non-orthogonal data signal being mixed with a desired data signal addressed to the subject user equipment in the mixed data signal; a second descrambler configured to descramble a control signal, of the plurality of control signals, that corresponds to the other user equipment using the identifier of the other user equipment recognized by the recognizer; a non-orthogonal signal demodulator configured to demodulate the non-orthogonal data signal using the control signal corresponding to the other user equipment and descrambled by the second descrambler; a non-orthogonal signal canceller configured to cancel out a replica signal that amounts to the non-orthogonal data signal demodulated by the non-orthogonal signal demodulator from the mixed data signal; a desired data signal decoder configured to decode the desired data signal from a signal output from the non-orthogonal signal canceller, using the control signal corresponding to the subject user equipment and descrambled by the first descrambler; and an aggregation level determiner configured to, based on the control signal corresponding to the subject user equipment, determine an aggregation level that corresponds to that control signal. In this user equipment, the second descrambler uses the identifier of the other user equipment to attempt descrambling of one control signal among a plurality of control signals, of the plurality of control signals received by the radio receiver, that corresponds to an aggregation level higher than or the same as the aggregation level corresponding to the subject user equipment, if the descrambling of the control signal by the second descrambler fails, the second descrambler attempts descrambling of another control signal among the plurality of control signals, and if the descrambling of the control signal by the second descrambler is successful, the non-orthogonal signal demodulator demodulates the non-orthogonal data signal using a control signal output from the second descrambler.

A user equipment according to a second aspect of the present invention includes: a radio receiver configured to receive, from a base station, a mixed data signal transmitted in a format in which a plurality of data signals addressed to a plurality of user equipments in a group are transmitted using different downlink transmission powers such that the plurality of data signals are not orthogonal to each other and in which a plurality of data signals addressed to a plurality of user equipments in another group are transmitted using different downlink transmission powers such that the plurality of data signals are not orthogonal to each other, a plurality of control signals corresponding to the plurality of user equipments, and information indicating an identifier of at least one other user equipment, of the plurality of user equipments, that belongs to at least the group to which the subject user equipment belongs; a first descrambler configured to descramble a control signal for the subject user equipment using an identifier of the subject user equipment; a recognizer configured to recognize the identifier of the at least one other user equipment, to which at least one non-orthogonal data signal is addressed, the at least one non-orthogonal data signal being mixed with a desired data signal addressed to the subject user equipment in the mixed data signal; a second descrambler configured to descramble a control signal, of the plurality of control signals, that corresponds to the other user equipment using the identifier of the other user equipment recognized by the recognizer; a non-orthogonal signal demodulator configured to demodulate the non-orthogonal data signal using the control signal corresponding to the other user equipment and descrambled by the second descrambler; a non-orthogonal signal canceller configured to cancel out a replica signal that amounts to the non-orthogonal data signal demodulated by the non-orthogonal signal demodulator from the mixed data signal; a desired data signal decoder configured to decode the desired data signal from a signal output from the non-orthogonal signal canceller, using the control signal corresponding to the subject user equipment and descrambled by the first descrambler; and an aggregation level determiner configured to, based on the control signal corresponding to the subject user equipment, determine an aggregation level that corresponds to that control signal. In this user equipment, the second descrambler uses the identifier of the other user equipment to attempt descrambling of one control signal among a plurality of control signals, of the plurality of control signals received by the radio receiver, if the descrambling of the control signal by the second descrambler fails, the second descrambler attempts descrambling of another control signal among the plurality of control signals, if the descrambling of the control signal by the second descrambler is successful, the non-orthogonal signal demodulator demodulates the non-orthogonal data signal using a control signal output from the second descrambler, and if the aggregation level corresponding to the subject user equipment is higher than a certain value, the second descrambler, the non-orthogonal signal demodulator, and the non-orthogonal signal canceller do not operate, and the desired data signal decoder decodes the mixed data signal as the desired data signal.

Effect of the Invention

According to the first aspect of the present invention, based on a control signal corresponding to the user equipment, the user equipment determines an aggregation level that corresponds to the control signal, and uses a control signal that corresponds to an aggregation level higher than or the same as the determined aggregation level in blind decoding for demodulating a non-orthogonal data signal. Accordingly, processing for searching for a control signal corresponding to a destination of an interfering data signal (non-orthogonal data signal) to be canceled out is reduced.

According to the second aspect of the present invention, based on a control signal corresponding to the user equipment, the user equipment determines an aggregation level that corresponds to the control signal, and if the determined aggregation level is higher than a certain value, the user equipment does not execute a process for demodulating the non-orthogonal data signal. Accordingly, processing for searching for a control signal corresponding to a destination of an interfering data signal (non-orthogonal data signal) to be canceled out is reduced.

BRIEF DESCRIPTION OF THE DRAWINGS

FIG. 5 is a table showing PDCCH information elements required by the representative candidates for interference cancellers to be used in NOMA.

FIG. 6 is a diagram for describing aggregation levels to be used in LTE.

FIG. 7 is a block diagram showing a configuration of a base station according to a first embodiment of the present invention.

FIG. 8 is a table showing an example of an identifier information list to be used in the first embodiment.

FIG. 9 is a block diagram showing a configuration of a user equipment according to the first embodiment of the present invention.

FIG. 10 is a flowchart showing processing executed by the user equipment shown in FIG. 9 for identifying a PDCCH signal for the user equipment.

FIG. 11 is a flowchart showing processing executed by the user equipment shown in FIG. 9 for performing demodulation and decoding of a desired data signal.

FIG. 16 is a table showing an example of a list to be used in a fifth embodiment of the present invention.

MODES FOR CARRYING OUT THE INVENTION

Figure 1:
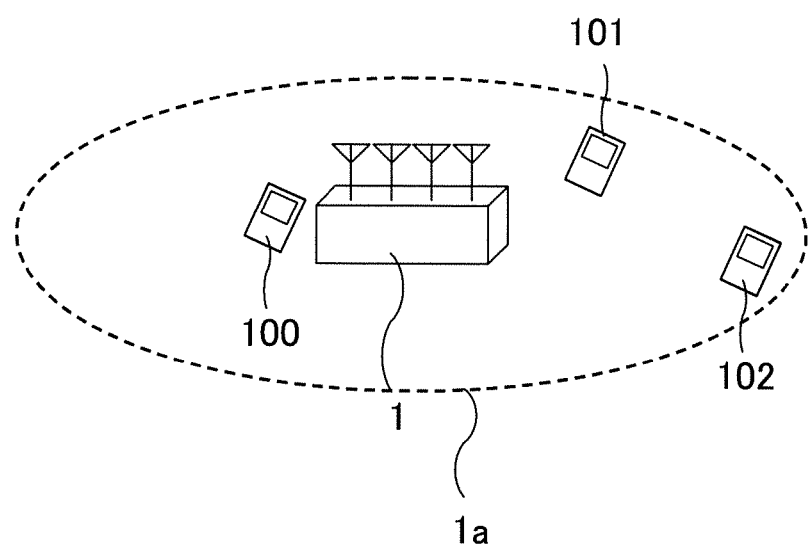
FIG. 1 is a schematic diagram showing a base station and user equipments, for describing an overview of non-orthogonal multiple access.

Hereinafter, various embodiments of the present invention will be described with reference to the accompanying drawings. First, an overview of non-orthogonal multiple access (NOMA) will be described. As shown in FIG. 1, a base station 1 communicates with multiple user equipments (UEs) 100 to 102. In FIG. 1, reference numeral 1a indicates a cell area of the base station 1. The UE 102 is at the cell area edge, or in other words, the position closest to the boundary of the cell area 1a, is the farthest from the base station 1, and has the largest path loss (or in other words, has the smallest reception SINR). The UE 100 is near the center of the cell area 1a, is the closest to the base station 1, and has the smallest path loss (or in other words, has the largest reception SINR). The UE 101 is closer to the base station 1 than the UE 102 is, and is farther from the base station 1 than the UE 100 is.

Figure 2:
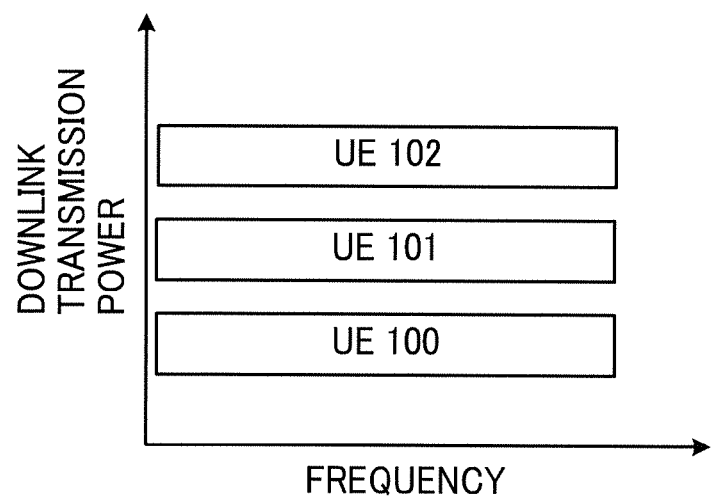
FIG. 2 is a diagram showing an example of allocation of downlink transmission powers to user equipments in non-orthogonal multiple access at a base station.

FIG. 2 is a diagram showing an example of allocation of downlink transmission powers to the UEs in NOMA, the allocation being performed at a base station. The base station 1 performs downlink data transmission using the same frequency for the same duration for the UEs 100 to 102. In other words, the same frequency and the same duration are allocated to the UEs 100 to 102. The base station 1 uses the highest downlink transmission power to perform transmission to the UE 102, which is the most remotely-located, and uses the lowest downlink transmission power to perform transmission to the UE 100, which is located the closest to the base station 1.

Note that the UEs connected to the base station 1 are not limited to the UEs 100 to 102. NOMA can be combined with orthogonal multiple access, and a frequency different from the frequency allocated to the UEs 100 to 102 may be allocated to UEs other than the UEs 100 to 102. Also, the number of UEs to which the same frequency is allocated for the same duration (number of UEs to be multiplexed using NOMA) is not limited to being three, and may be two or four or more.

From the standpoint of the UEs 100 to 102, the data signal with the highest reception power is the data signal addressed to the UE 102, and the data signal with the lowest reception power is the data signal addressed to the UE 100. The UEs 100 to 102 each first demodulate the data signal with the highest reception power. Because this demodulated data signal is the data signal addressed to the UE 102, which is at the position that is the closest to the boundary of the cell area 1a, the UE 102 ends demodulation and uses this demodulated data signal. The other UEs 100 and 101 each use an interference canceller to remove the interference component (replica signal) amounting to the demodulated data signal from the received signal, and demodulate the data signal with the second-highest reception power. Because this demodulated data signal is the data signal addressed to the UE 101, which is at the position that is the second-closest to the boundary of the cell area 1a, the UE 101 ends demodulation and uses this demodulated data signal. By thus repeating the demodulation and canceling out of the data signals with high reception powers as necessary, all of the UEs 100 to 102 can demodulate the data signals addressed to them. Thus, with NOMA, a UE cancels out the data signals (interference signals) that are transmitted from the serving base station 1 and are addressed to other UEs until the data signal addressed to that UE is demodulated.

With SLIC and ML described above, interference signals are demodulated and replica signals that result from the demodulation are canceled out from the received signal. On the other hand, with CWIC, decoding is performed in addition to demodulation on the interference signals, and replica signals that result from the decoding are canceled out from the received signal. In the following description, demodulation of an interference signal using SLIC and ML, and a combination of demodulation and decoding of an interference signal using CWIC are simply referred to as "demodulation".

Figure 3:
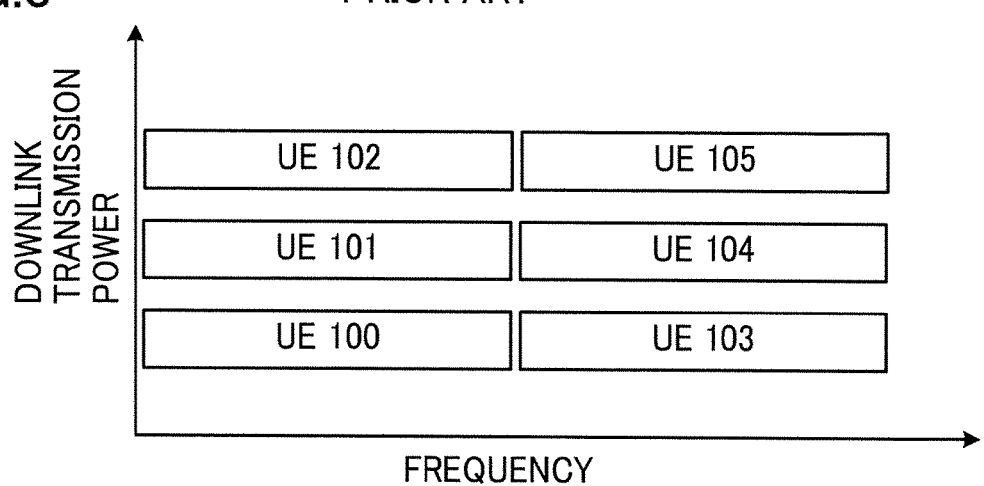
FIG. 3 is a diagram showing another example of allocation of downlink transmission powers to user equipments in non-orthogonal multiple access at a base station.

FIG. 3 is a diagram showing another example of allocation of downlink transmission powers to user equipments in NOMA by a base station. The UEs 100 to 102 constitute one group of data apparatuses with different transmission powers, and UEs 103 to 105 constitute another group of data apparatuses with different transmission powers. A UE for which the reception power is low (e.g., UE 103) demodulates the data signals addressed to other UEs that belong to the same group as that UE and for which the reception powers are high (e.g., UEs 104 and 105), and cancels out the replica signal that results from the demodulation.

Figure 4:
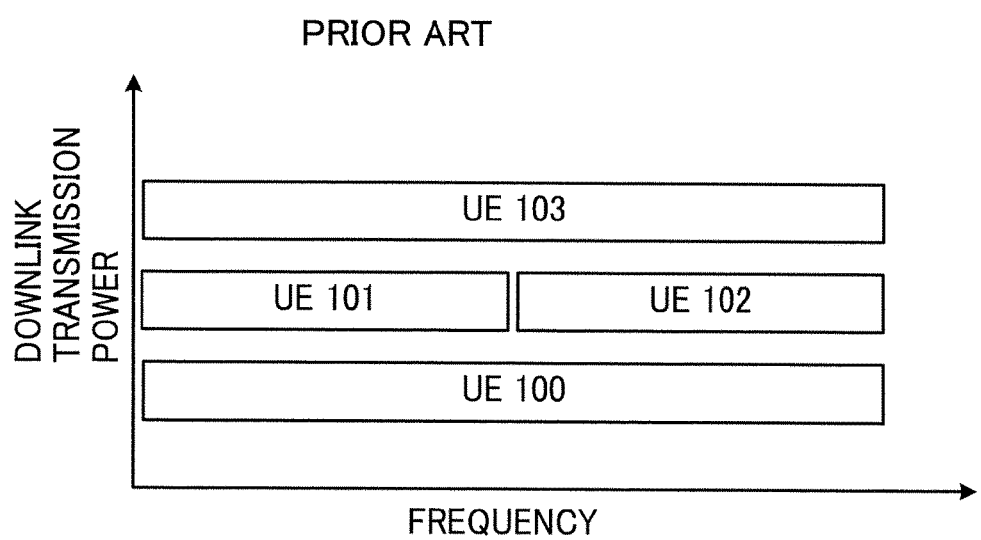
FIG. 4 is a diagram showing another example of allocation of downlink transmission powers to user equipments in non-orthogonal multiple access at a base station.

FIG. 4 is a diagram showing another example of allocation of downlink transmission powers to user equipments in NOMA by a base station. In this example, the highest transmission power is allocated to the UE 103, a mid-level transmission power is allocated to the UEs 101 and 102, and the lowest transmission power is allocated to the UE 100. Although the same transmission power is allocated to the UEs 101 and 102, the UEs 100, 101, and 103 constitute one group of data apparatuses with different transmission powers, and the UEs 100, 102, and 103 constitute another group of data apparatuses with different transmission powers. The UEs 101 and 102 each demodulate the data signal addressed to the UE 103 and cancel out the replica signal that results from the demodulation. The UE 100 demodulates the data signals addressed to the other UEs (i.e., UEs 101 to 103) belonging to both groups to which the UE 100 belongs.

With LTE, various types of information elements transmitted with a PDCCH signal (physical dedicated control channel signal) corresponding to a UE that is the destination of the data signal are required for demodulation and decoding of that data signal. Accordingly, the interference canceller needs to decrypt the PDCCH signals corresponding to the other UEs. The information elements transmitted with the PDCCH are written in Section 5.3.3.1 of 3GPP TS 36.212 V11.4.0, and the information elements differ according to the DCI (Downlink Control Information) format.

FIG. 5 shows PDCCH information elements required by the representative candidates for interference cancellers to be used in NOMA. In particular, CWIC requires more information elements than SLIC or ML does. A UE provided with an interference canceller needs to know these various types of information elements of the other UEs that are interference sources.

A CRC (Cyclic Redundancy Check) bit that is scrambled using a C-RNTI (Cell-Radio Network Temporary ID) of the UE that is the destination is included in the PDCCH signal, and if a C-RNTI obtained by descrambling the PDCCH signal matches the RNTI of a UE, the PDCCH signal is the PDCCH signal for that UE. Utilizing the same principle, if a UE knows the C-RNTI of another UE, the UE can descramble the PDCCH signal for the other UE and decrypt the control information elements included therein. Note that C-RNTI is referred to hereinafter simply as RNTI for the sake of simplicity in the description.

However, there are many candidates for radio resources through which the PDCCH signals are to be transmitted. For this reason, if the UEs do not know the radio resource through which the PDCCH signal corresponding to the destination of the interference data signal, to be canceled out, is to be transmitted, the UEs need to check many PDCCH signals using blind decoding to find out which PDCCH signal is the PDCCH signal corresponding to the destination of the interference data signal. The blind decoding requires an enormous amount of processing.

First Embodiment

In view of this, in the first embodiment of the present invention, a UE determines, based on a PDCCH signal that corresponds to the UE, an aggregation level that corresponds to the PDCCH signal, and the UE uses the PDCCH signals corresponding to the aggregation levels greater than or the same as the determined aggregation level in blind decoding for demodulation of the non-orthogonal data signal (interference data signal).

With LTE, the concept of aggregation levels is used in the transmission of PDCCH signals. FIG. 6 shows aggregation levels. A PDCCH is allocated to an REG (resource element group) other than a PCFICH (physical control format indication channel) and a PHICH (physical Hybrid-ARQ indicator channel). The concept of CCEs (Control Channel Elements) is used in the allocation of a PDCCH. One CCE is a set of nine consecutive REGs, and one REG is a set of four resource elements.

The number of CCEs to which the DCI transmitted with the PDCCH is allocated differs according to the aggregation level. The aggregation level is one of different aggregation levels 1, 2, 4, and 8. Description will be given using eight CCEs hereinafter. With aggregation level 1, eight PDCCH signals corresponding to eight UEs are transmitted using eight CCEs. That is, one PDCCH signal corresponding to one UE is transmitted using the CCE of index 0, one PDCCH signal corresponding to one UE is transmitted using the CCE of index 1, and one PDCCH signal corresponding to one UE is transmitted using the CCE of index 2. Thus, one PDCCH signal corresponding to one UE is transmitted using each CCE.

With aggregation level 2, four PDCCH signals corresponding to four UEs are transmitted using eight CCEs. That is, one PDCCH signal corresponding to one UE is transmitted using the CCEs of indices 0 and 1, one PDCCH signal corresponding to one UE is transmitted using the CCEs of indices 2 and 3, and one PDCCH signal corresponding to one UE is transmitted using the CCEs of indices 4 and 5. Thus, one PDCCH signal corresponding to one UE is transmitted using each pair of CCEs.

With aggregation level 4, two PDCCH signals corresponding to two UEs are transmitted using eight CCEs. In other words, one PDCCH signal corresponding to one UE is transmitted using the CCEs of indices 0 to 3, one PDCCH signal corresponding to one UE is transmitted using the CCEs of indices 4 to 7, and one PDCCH signal corresponding to one UE is transmitted using the CCEs of indices 8 to 11. Thus, one PDCCH signal corresponding to one UE is transmitted using each set constituted by four CCEs.

With aggregation level 8, one PDCCH signal corresponding to one UE is transmitted using eight CCEs. That is, one PDCCH signal corresponding to one UE is transmitted using the CCEs of indices 0 to 7, one PDCCH signal corresponding to one UE is transmitted using the CCEs of indices 8 to 15, and one PDCCH signal corresponding to one UE is transmitted using the CCEs of indices 16 to 23. Thus, one PDCCH signal corresponding to one UE is transmitted using each set constituted by eight CCEs.

Thus, the lower the aggregation level is, the fewer the CCEs allocated to one UE (one PDCCH signal) there are, and the higher the aggregation level is, the smaller the number of UEs (number of PDCCH signals) for which eight CCEs are used is. The purpose of this is to increase the probability of successful reception of the PDCCH signals by giving a high aggregation level to a UE with low downlink reception quality. The aggregation level is set by the base station based on a CQI, ACK/NACK, or the like, which is fed back from the UE. A low aggregation level is set for a UE with good downlink reception quality, and a high aggregation level is set for a UE with poor downlink reception quality.

The base station does not notify a UE of the aggregation level and CCEs to which the PDCCH for the UE is allocated. However, if the UE successfully decrypts the PDCCH signal for the UE (if the UE can identify the PDCCH signal of the UE from among many PDCCH signals), the UE will know the CCEs thereof, and therefore will also know the aggregation level. In order to simplify the identifying of the PDCCH signal by the UE, restrictions are placed on CCE allocation. Specifically, if a UE with aggregation level 1 is allocated to the CCE of index 0, only another UE with aggregation level 1 can be allocated to the CCE of index 1. However, another UE with aggregation level 1 or 2 can be allocated to the CCE of index 2, and another UE with aggregation level 1, 2, or 4 can be allocated to the CCE of index 4 (another UE with aggregation level 8 cannot be allocated to the CCEs of indices 1 to 7). If a UE with aggregation level 2 is allocated to the CCE of index 0, only that UE can be allocated to the CCE of index 1 thereafter, another UE with aggregation level 1 or 2 can be allocated to the CCE of index 2, and another UE with aggregation level 1, 2, or 4 can be allocated to the CCE of index 4 (another UE with aggregation level 8 cannot be allocated to the CCEs of indices 1 to 7). If a UE with aggregation level 4 is allocated to the CCE of index 0, only that UE can be allocated to the CCEs of indices 1 to 3, and another UE with aggregation level 1, 2, or 4 can be allocated to the CCE of index 4 (another UE with aggregation level 8 cannot be allocated to the CCEs of indices 1 to 7). If a UE with aggregation level 8 is allocated to the CCE of index 0, only that UE can be allocated to the CCEs of indices 1 to 7 thereafter. In other words, if the aggregation level is n, the CCE index that is a multiple of n is the starting number of the CCE for the PDCCH signal of the UE with that aggregation level.

As described above, a low aggregation level is set for a UE with good downlink reception quality. With NOMA, a low data transmission power is allocated to a UE with good downlink reception quality, and a low aggregation level is set therefor. On the other hand, a high data transmission power is allocated to a UE with poor downlink reception quality, and a high aggregation level is set therefor. Accordingly, it is envisioned that for a UE whose data signal is overlapped with those of other UEs in NOMA, there is little need to attempt decryption of PDCCHs with an aggregation level lower than that of the UE in order to decrypt the PDCCHs addressed to the other UEs. Accordingly, based on the aggregation level of the UE, it is possible to limit the search space in which the PDCCH signals of the other UEs are searched for.

If the aggregation level allocated to a UE is 4, that UE needs to cancel out the data signal addressed to the UE whose aggregation level is 8, but does not need to cancel out the data signals addressed to the UEs whose aggregation levels are 1, 2, and 4. Accordingly, if the aggregation level allocated to the UE is 4, the PDCCH signal with aggregation level 8 (sets composed of eight CCEs whose indices start at multiples of 8 and 0) need to be decrypted, but PDCCH signals with aggregation levels 1, 2, and 4 do not need to be decrypted. In other words, sets composed of one CCE, sets composed of two CCEs, and sets composed of four CCEs can be excluded from the targets whose PDCCH signals are to be decrypted.

If the aggregation level allocated to a UE is 2, that UE needs to cancel out the data signals addressed to the UEs whose aggregation levels are 4 and 8, but does not need to cancel out the data signals addressed to the UEs whose aggregation levels are 1 and 2. Accordingly, if the aggregation level allocated to a UE is 2, that UE needs to decrypt PDCCH signals with aggregation levels 4 and 8 (sets of CCEs whose indices start at multiples of 4 and 0), but the UE does not need to decrypt PDCCH signals of aggregation levels 1 and 2. In other words, sets composed of one CCE and sets composed of two CCEs can be excluded from the targets whose PDCCH signals are to be decrypted.

If the aggregation level allocated to a UE is 1, the UE needs to decrypt the PDCCH signals with an aggregation level of 2 or more (set of CCEs whose indices start at multiples of 2 and 0), but the UE does not need to decrypt the PDCCH signals with aggregation level 1. In other words, sets composed of one CCE can be excluded from the targets whose PDCCH signals are to be decrypted.

FIG. 7 is a block diagram showing a configuration of a base station according to a first embodiment of the present invention. The base station 1 includes a controller 30, a radio transmitter 32, multiple transmission antennas 33, a radio receiver 34, a reception antenna 35, and an inter-base station communicator 36.

The radio transmitter 32 is a transmission circuit for converting an electrical signal into a radio wave to be transmitted from the transmission antenna 33 in order for the base station 1 to perform radio transmission to the UEs. The transmission antenna 33 constitutes an adaptive antenna array. The radio receiver 34 is a reception circuit for converting the radio wave received from the reception antenna 35 into an electrical signal in order for the base station 1 to perform radio reception from the UEs. The inter-base station communicator 36 is a communication interface for the base station 1 to perform communication with another base station.

The controller 30 includes a CQI reporting processor 38, a control signal generator 40, a scheduler 41, a downlink transmission power determiner 42, and an RRC (radio resource control) signal generator 43. The controller 30 is a CPU (central processing unit) that operates in accordance with a computer program. The internal components of the controller 30 are functional blocks that are realized due to the controller 30 functioning in accordance with the computer program.

The controller 30 processes uplink data signals that have been transmitted from the UEs connected to the base station 1 and have been received by the radio receiver 34. The CQI reporting processor 38 recognizes the SINRs at the UEs based on CQIs (channel quality indicators) that have been reported from the UEs connected to the base station 1 and have been received by the radio receiver 34.

The control signal generator 40 generates control signals (PDCCH signals) addressed to the UEs based on the SINRs at the UEs and other parameters. Based on the SINRs at the UEs and/or the other parameters, the scheduler 41 determines the frequency resources and time resources for transmitting the downlink data signals addressed to the respective multiple UEs connected to the base station 1. Also, the scheduler 41 determines UEs that are to be subjected to NOMA, and furthermore determines grouping for NOMA.

Based on the SINRs at the UEs, the downlink transmission power determiner 42 determines downlink transmission powers to be used in the downlink data transmission to the UEs that are connected to the base station 1 and are to be subjected to NOMA. In other words, the downlink transmission power determiner 42 allocates one of the different downlink transmission powers to be used in the downlink data transmission to each UE according to the reception qualities of the multiple UEs. The method for determining the downlink transmission power may be any publically known method relating to NOMA or a method that suits NOMA. The downlink transmission power determiner 42 allocates a high downlink transmission power to a UE with low reception quality.

The RRC signal generator 43 generates a signal (hereinafter referred to as an RRC signal) for RRC signaling (higher layer signaling). An RRC signal has a longer period than the period (1 subframe (1 ms)) of a PDCCH signal. For example, the period may be 100 ms or 1 s. In this embodiment, the RRC signal generator 43 references the grouping for NOMA, which is determined by the scheduler 41, and in the RRC signal, the RRC signal generator 43 includes identifier information indicating multiple RNTIs of all of the UEs belonging to one of the groups to which NOMA is to be applied.

The controller 30 supplies the downlink data signals and PDCCH signals addressed to the multiple UEs connected to the base station 1 to the radio transmitter 32. The radio transmitter 32 transmits the downlink data signals and PDCCH signals using the transmission antennas 33. For each group to which NOMA is to be applied, the radio transmitter 32 transmits a mixed data signal obtained by mixing multiple data signals that are not orthogonal to each other, with each data signal being addressed to a corresponding one of the multiple UEs that are to be subjected to NOMA, such that each data signal is transmitted using the corresponding downlink transmission power determined by the downlink transmission power determiner 42. Accordingly, data signals are transmitted using different downlink transmission powers to the multiple UEs for which the same frequency is used during the same period of time in downlink transmission. The radio transmitter 32 transmits the mixed data signal in a format in which mutually non-orthogonal multiple data signals addressed to multiple UEs in a group are transmitted using different downlink transmission powers, and mutually non-orthogonal multiple data signals addressed to multiple UEs in another group are transmitted using different downlink transmission powers. The allocation of the downlink transmission powers may be one such as the example shown in FIG. 3, or may be one such as the example shown in FIG. 4.

Also, the radio transmitter 32 transmits multiple PDCCH signals to the respective multiple UEs, such that each UE uses a corresponding PDCCH signal to decode the data signal addressed to that UE. The radio transmitter 32 performs transmission using a format in which each PDCCH signal is scrambled using the RNTI of the UE corresponding to that PDCCH signal.

Also, using a period that is longer than the period of the PDCCH signal, the radio transmitter 32 transmits RRC signals including identifier information that indicates the multiple RNTIs of all of the UEs each belonging to any one of the groups to which NOMA is applied. The identifier information indicates the RNTIs of the UEs of all groups to which NOMA is to be applied by the base station. Accordingly, the UEs connected to the base station receive an RRC signal including such identifier information. Each UE that belongs to a group and for which the downlink transmission power is not the highest can reference the identifier information to descramble the PDCCH signals for the other UEs, the other UEs belonging to the same group as the UE, being the destinations of interference data signals, and being allocated with higher transmission powers than that for the UE, and the UE can use the control information elements included in the PDCCH signals for the other UEs to demodulate and cancel out the interference data signals.

The radio transmitter 32 does not transmit, to each UE, information indicating the radio resources (CCEs) that are used in the transmission of the PDCCH signals for that UE and the other UEs.

Because the RRC signal includes identifier information indicating the multiple RNTIs of all of the UEs each belonging to any one of the groups to which NOMA is to be applied, in the downlink transmission power allocation such as shown in FIG. 3, every UE shown in FIG. 3 knows the RNTIs of all of the UEs shown in FIG. 3, regardless of the group to which the UE belongs.

In the downlink transmission power allocation shown in FIG. 3, the UE 101 can decrypt the PDCCH signal for the UE 102 using the RNTI of the UE 102, and can demodulate the data signal addressed to the UE 102 using the information element included in that PDCCH signal. The UE 104 can decrypt the PDCCH signal for the UE 105 using the RNTI of the UE 105, and can demodulate the data signal addressed to the UE 105 using the information element included in that PDCCH signal. The UE 100 can decrypt the PDCCH signal for the UE 102 using the RNTI of the UE 102, can demodulate the data signal addressed to the UE 102 using the information element included in that PDCCH signal, can further decrypt the PDCCH signal for the UE 101 using the RNTI of the UE 101, and can demodulate the data signal addressed to the UE 101 using the information element included in that PDCCH signal. The UE 103 can decrypt the PDCCH signal for the UE 105 using the RNTI of the UE 105, can demodulate the data signal addressed to the UE 105 using the information element included in that PDCCH signal, can further decrypt the PDCCH signal for the UE 104 using the RNTI of the UE 104, and can demodulate the data signal addressed to the UE 104 using the information element included in that PDCCH signal.

In the downlink transmission power allocation as shown in FIG. 4, the UE 101 and the UE 102 can decrypt the PDCCH signal for the UE 103 using the RNTI of the UE 103, and can demodulate the data signal addressed to the UE 103 using the information element included in that PDCCH signal. The TIE 100 can decrypt the PDCCH signal for the UE 103 using the RNTI of the UE 103, can demodulate the data signal addressed to the UE 103 using the information element included in that PDCCH signal, can further decrypt the PDCCH signal for the UE 101 using the RNTI of the UE 101, can demodulate the data signal addressed to the UE 101 using the information element included in that PDCCH signal, can decrypt the PDCCH signal for the UE 102 using the RNTI of the UE 102, and can demodulate the data signal addressed to the UE 102 using the information element included in that PDCCH signal.

FIG. 8 is a table showing an example of identifier information indicating RNTIs. As shown in FIG. 8, the identifier information may be in a list format. Each RNTI has a length of 16 bits, but the bit length of the RNTI depends on the system. UEs belonging to all groups may be semi-statically notified of this list through higher layer signaling (RRC signaling). The list may be compressed using an existing data compression technique. An increase in the amount of information transmitted by higher layer signaling can be suppressed using compression.

FIG. 9 is a block diagram showing a configuration of a UE 10 according to the first embodiment. The above-described UEs (UE 100 and others) each have the same configuration as that of the UE 10. The UE 10 includes a controller 50, a radio transmitter 52, a transmission antenna 53, a radio receiver 54, and multiple reception antennas 55.

The radio transmitter 52 is a transmission circuit for converting an electrical signal into a radio wave to be transmitted from the transmission antenna 53 in order for the UE 10 to perform radio transmission to a serving base station. The radio receiver 54 is a reception circuit for converting the radio wave received from the reception antenna 55 into an electrical signal in order for the UE 10 to perform radio reception from the serving base station. The reception antenna 55 constitutes an adaptive antenna array.

The controller 50 is a CPU that operates in accordance with a computer program. The controller 50 includes a reception quality measurer 60, a CQI reporter 61, a first PDCCH descrambler (first descrambler) 62, a recognizer 64, a second PDCCH descrambler (second descrambler) 66, a non-orthogonal signal demodulator 68, a non-orthogonal signal canceller 70, a desired data signal demodulator/decoder (desired data signal decoder) 72, and an aggregation level determiner 74. These internal components of the controller 50 are functional blocks that are realized due to the controller 50 functioning in accordance with the computer program.

The controller 50 supplies an uplink data signal to the radio transmitter 52, and the radio transmitter 52 transmits the uplink data signal to the serving base station using the transmission antenna 53. The reception quality measurer 60 measures the SINR of the radio signal received by the radio receiver 54. The CQI reporter 61 generates a CQI based on the SINR and supplies the CQI to the radio transmitter 52. The radio transmitter 52 transmits the CQI to the serving base station using a control channel.

From the serving base station, the radio receiver 54 receives a mixed data signal including multiple data signals that are respectively addressed to multiple UEs, have different powers, and are not orthogonal to each other, multiple PDCCH signals that correspond to the respective multiple UEs, and an RRC signal having the above-described identifier information.

The first PDCCH descrambler 62 descrambles the PDCCH signal corresponding to the UE 10 using the RNTI of the UE 10.

The recognizer 64 analyzes the RRC signal and recognizes the RNTIs of all of the other UEs included in the identifier information of the RRC signal.

The second PDCCH descrambler 66 descrambles the PDCCH signals corresponding to the other UEs using the RNTIs of the other UEs recognized by the recognizer 64. The non-orthogonal signal demodulator 68 demodulates the non-orthogonal data signal using the control information elements included in the PDCCH signals that correspond to the other UEs and have been descrambled by the second PDCCH descrambler 66. The non-orthogonal signal canceller 70 cancels out replica signals of the non-orthogonal data signals demodulated by the non-orthogonal signal demodulator 68 from the mixed data signal. Accordingly, the second PDCCH descrambler 66, the non-orthogonal signal demodulator 68, and the non-orthogonal signal canceller 70 constitute the interference canceller of this UE. The interference canceller may be SLIC, CWIC, or ML. If the interference canceller is CWIC, the non-orthogonal signal demodulator 68 performs decoding in addition to demodulation of the non-orthogonal data signals.

The desired data signal demodulator/decoder 72 uses the PDCCH signal that corresponds to the subject UE and has been descrambled by the first PDCCH descrambler 62 to decode the desired data signal using the signal output from the non-orthogonal signal canceller 70.

The aggregation level determiner 74 distinguishes the CCE of the PDCCH signal corresponding to the UE and determines an aggregation level that corresponds to the PDCCH signal based on that CCE. The second PDCCH descrambler 66 uses the RNTIs of the other UEs to attempt descrambling of multiple PDCCH signals that correspond to the aggregation levels higher than the aggregation level corresponding to the UE.

FIG. 10 is a flowchart showing processing for identifying the PDCCH signal of the UE 10, the processing being executed by the UE 10. In step S1, the first PDCCH descrambler 62 selects one candidate among multiple PDCCH signals (the multiple PDCCH signals including the PDCCH signal of the UE 10) transmitted from the base station, and in step S2, the first PDCCH descrambler 62 uses the RNTI of the UE 10 to attempt descrambling of the PDCCH signal corresponding to the UE 10. The PDCCH signal includes a CRC bit scrambled using the RNTI, and if the RNTI obtained by descrambling the selected PDCCH signal candidate matches the RNTI of the UE, the PDCCH signal candidate is the PDCCH signal for that UE. If it is determined in step S4 that the first PDCCH descrambler 62 did not successfully descramble the PDCCH signal of the UE (if the RNTI obtained by descrambling the PDCCH signal candidate does not match the RNTI of the UE), the first PDCCH descrambler 62 selects another PDCCH signal candidate (step S5) and descrambles that PDCCH signal candidate (step S2).

If it is determined in step S4 that the first PDCCH descrambler 62 has successfully descrambled the PDCCH signal of the UE (if the RNTI obtained by descrambling the PDCCH signal candidate matched the RNTI of the UE), the controller 50 stores the control information element that is included in the PDCCH signal and is needed for demodulation and decoding of the desired data signal in a storage device (not shown) (step S5A).

FIG. 11 is a flowchart showing processing for performing demodulation and decoding of a desired data signal, the processing being executed by the UE 10. This processing is executed with the same period as that of the PDCCH signal. Before this processing is executed, the UE 10 receives an RRC signal with a long period from the base station and the recognizer 64 recognizes the RNTIs of all of the other UEs included in the identifier information.

The second PDCCH descrambler 66 selects one of the RNTIs of the other UEs recognized by the recognizer 64 (step S6). After step S6, in step S8A, the aggregation level determiner 74 distinguishes the CCE of the PDCCH signal corresponding to the UE and determines an aggregation level that corresponds to the PDCCH signal based on the CCE.

Also, in step S8B, the aggregation level determiner 74 determines a group of CCEs (CCE group) that corresponds to the PDCCH signal candidate for another UE based on the aggregation level corresponding to the UE. As described above, if the aggregation level allocated to the UE is 2, for example, it is not necessary to decrypt the PDCCH signals with aggregation levels 1 and 2, and therefore sets each composed of one CCE and sets each composed of two CCEs can be excluded from the targets of decrypting the PDCCH signals. In this case, the PDCCH signals with aggregation levels 4 and 8 are to be decrypted, and therefore the aggregation level determiner 74 determines a set of CCEs whose indices start at multiples of 4 and 0 as the CCE group corresponding to the PDCCH signal candidates for the other UE.

In step S8C, the second PDCCH descrambler 66 selects one CCE out of the CCE group determined in step S8B, and in step S9, the second PDCCH descrambler 66 uses the RNTI of the other UE to attempt descrambling of the PDCCH signal candidate at that CCE. Thus, the second PDCCH descrambler 66 attempts descrambling of the multiple PDCCH signal candidates corresponding to the aggregation levels higher than the aggregation level corresponding to the UE.

If the RNTI obtained by descrambling the PDCCH signal candidate for the other UE matches the RNTI of that other UE, that PDCCH signal candidate is the PDCCH signal for that other UE. If it is determined in step S10 that the second PDCCH descrambler 66 did not successfully descramble the PDCCH signal of the other UE (if the RNTI obtained by descrambling the PDCCH signal candidate does not match the RNTI of the other UE selected in step S6), the second PDCCH descrambler 66 selects another CCE out of the CCE group determined in step S8B (step S11A), and descrambles that other PDCCH signal candidate (step S9).

Even if the UE uses the RNTI of another UE to attempt descrambling of one PDCCH signal candidate among the multiple PDCCH signal candidates and succeeds at descrambling (even if the result of step S10 is positive), the descrambled PDCCH signal is not necessarily the PDCCH signal for another UE belonging to the same group as the UE 10. This is because, as described above, the RRC signal includes identifier information indicating the multiple RNTIs of all of the UEs each belonging to any one of the groups to which NOMA is to be applied, and therefore the RNTIs of the other UEs known by the UE include not only the RNTIs of the UEs that are the destinations of the non-orthogonal data signals overlapped on the data signal addressed to the UE, but also the RNTIs of UEs belonging to another group.

In view of this, in step S12A, the non-orthogonal signal demodulator 68 attempts demodulation of the non-orthogonal data signal using the control information element in the PDCCH signal for the other UE and determines in step S12B whether or not demodulation was successful. If the demodulation of the non-orthogonal data signal is successful, in step S13, the non-orthogonal signal canceller 70 cancels out the replica signal of the non-orthogonal data signal from the mixed data signal.

However, if the demodulation of the non-orthogonal data signal fails, the PDCCH signal used in the demodulation is the PDCCH signal of a UE in another group, and does not correspond to the interference data signal overlapped on the desired data signal addressed to the UE 10, and therefore the processing moves to step S12C. In step S12C, the second PDCCH descrambler 66 selects another RNTI recognized by the recognizer 64. The second descrambler 66 uses the other RNTI that is indicated in the identifier information of the RRC signal from the base station and that has been recognized by the recognizer 64, to attempt descrambling of one PDCCH signal candidate among the multiple PDCCH signal candidates corresponding to the multiple UEs (step S8C and step S9).

If the RNTI of yet another UE is included in the identifier information of the RRC signal from the base station, the determination in step S14A is positive, and the processing returns to step S8C.

If there are no more RNTIs of other UEs to be checked (if the determination in step S14A is negative), no interference data signal addressed to another UE that belongs to the same group as the UE 10 and for which the power is higher than that for the UE 10 is overlapped on the desired data signal addressed to the UE 10. In this case, the desired data signal demodulator/decoder 72 uses the PDCCH signal that corresponds to the UE and has been descrambled by the first PDCCH descrambler 62 to decode the desired data signal from the signal output from the non-orthogonal signal canceller 70 (step S16).

In this embodiment, the search space in which the PDCCH signals of the other UEs, which are the destinations of the interference data signals (non-orthogonal data signals) to be canceled out, are searched for can be limited based on the aggregation level of the UE, the processing load of the UE can be reduced, and the PDCCH signals of the other UEs can be discovered quickly.

The second PDCCH descrambler 66 may use the RNTIs of other UEs to attempt descrambling of the multiple PDCCH signals corresponding to the aggregation levels higher than or the same as the aggregation level corresponding to the UE. For example, if the aggregation level allocated to the UE is 2, the PDCCH signal with aggregation level 2 may be decrypted in addition to those with aggregation levels 4 and 8, and in step S8B, the aggregation level determiner 74 determines a set of CCEs whose indices start at multiples of 2 and 0 as the CCE group corresponding to the PDCCH signal candidates for other UEs. Accordingly, the second PDCCH descrambler 66 attempts descrambling of the multiple PDCCH signal candidates corresponding to the aggregation levels 2, 4, and 8, which are higher than or the same as aggregation level 2, which corresponds to the UE.

Alternatively, if the aggregation level of the UE determined in step S8A is 1 or 2, in step S8B, the aggregation level determiner 74 may determine the set of CCEs whose indices start at multiples of 4 and 0 as the CCE group corresponding to the PDCCH signal candidates for other UEs. In this case, in step SBC, the CCEs with aggregation levels 4 and 8 are selected, and in step S9, the second PDCCH descrambler 66 attempts descrambling of the PDCCH signal candidates for the other UEs at those CCEs using the RNTIs of the other UEs.

Also, according to this embodiment, the base station performs notification of the identifier information indicating the multiple RNTIs of all of the UEs each belonging to any one of the groups to which NOMA is to be applied, the notification being sent to the multiple UEs each belonging to any one of the groups to which NOMA is to be applied, using a period that is longer than the transmission period of the PDCCH signals. Each UE that belongs to a group and for which the downlink transmission power is not the highest can use the RNTIs indicated in the identifier information, to descramble the PDCCH signal for another UE that belongs to the same group as the UE and is the destination of a data signal with higher transmission power than the transmission power used for the desired data signal for the UE, and the UE can thereby demodulate the interference data signal addressed to the other UE and cancel out a replica signal that amounts to the interference data signal from the mixed data signal. Because no PDCCH signal is used in the transmission of the identifier information, an increase in the amount of information for the interference canceller that is transmitted with the PDCCH signal can be suppressed. Because the transmission period for the identifier information is longer than the transmission period for the PDCCH signal, it is possible to suppress an increase in traffic.

Also, according to this embodiment, regardless of the grouping for NOMA, identifier information indicating the multiple RNTIs of all of the UEs that each belong to any one of the groups to which NOMA is to be applied is transmitted to the UEs connected to the base station, and therefore the processing load of the base station is lighter compared to a mode in which the base station determines which UE is to be notified of which RNTI in accordance with the grouping for NOMA.

Second Embodiment

Next, a second embodiment of the present invention will be described.

As described above regarding the first embodiment, a low aggregation level is set for a UE with good downlink reception quality, and a high aggregation level is set for a UE with poor downlink reception quality. With NOMA, a low transmission power is allocated to a UE with good downlink reception quality, and that UE cancels out data signals addressed to UEs that have poor reception quality and have high transmission powers allocated thereto. Accordingly, a UE for which a high aggregation level is set is a UE that has poor downlink reception quality and has a high transmission power allocated thereto, and such a UE can decode a desired data signal without canceling out the data signals addressed to other UEs, even if interference data signals (low power) addressed to other UEs are overlapped through NOMA on the desired data signal (high power) addressed to that UE.

In view of this, a UE according to the second embodiment determines the aggregation level of a PDCCH signal corresponding to that UE based on that PDCCH signal, and if the aggregation level corresponding to that UE is higher than a certain value (e.g., 2 or 4), that UE decodes the desired data signal without canceling out the data signals addressed to the other UEs. For this reason, if the aggregation level corresponding to that UE is higher than a certain value (e.g., 2 or 4), decrypting of the PDCCH signals of the other UEs is not performed, and demodulation of the data signals addressed to the other UEs is not performed.

The block diagram of the UE according to the second embodiment is the same as that in FIG. 9. However, if the aggregation level that has been determined by the aggregation level determiner 74 and corresponds to the PDCCH signal is higher than a certain value, the second PDCCH descrambler 66, the non-orthogonal signal demodulator 68, and the non-orthogonal signal canceller 70 do not operate, and the desired data signal demodulator/decoder 72 decodes the mixed data signal as the desired data signal.

Processing executed by the UE 10 according to the second embodiment for performing demodulation and decoding of the desired data signal will be described with reference to the flowchart of FIG. 12. This processing is similar to the processing shown in FIG. 11, the same reference numerals are used to indicate steps that are the same as those in the processing shown in FIG. 11, and such steps will not be described in detail. The processing for identifying the PDCCH signal of the UE 10 (FIG. 10), which is executed by the UE 10, is executed in this embodiment as well.

Figure 12:
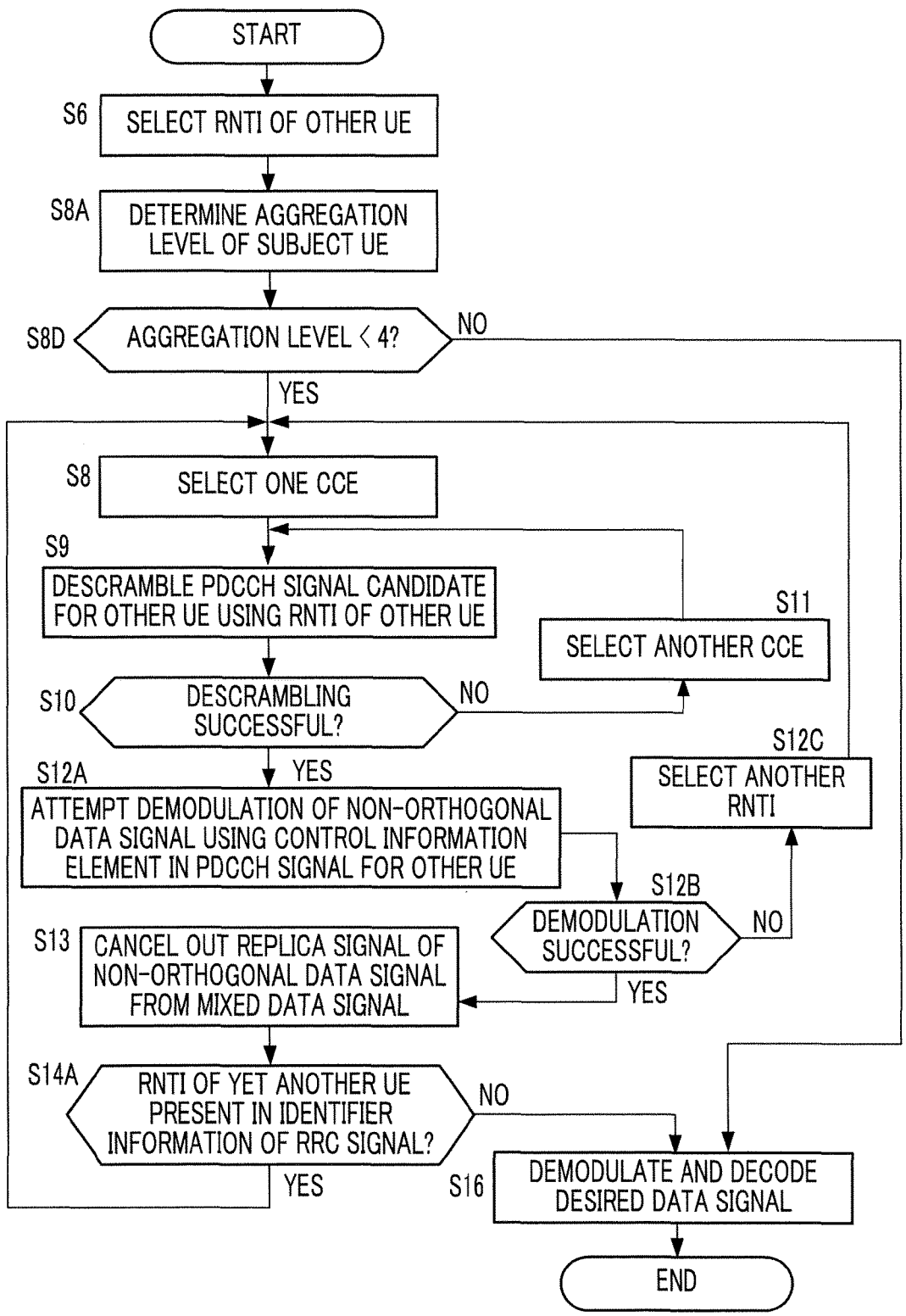
FIG. 12 is a flowchart showing processing executed by a user equipment according to a second embodiment of the present invention for performing demodulation and decoding of a desired data signal.

In the processing shown in FIG. 12, after step S6, in step S8A, the aggregation level determiner 74 distinguishes the CCEs of the PDCCH signal corresponding to the UE and determines an aggregation level that corresponds to the PDCCH signal based on the CCEs.

Also, in step S8D, the aggregation level determiner 74 determines whether or not the aggregation level corresponding to the PDCCH signal is lower than a certain threshold value (e.g., 4). If the determination of step S8D is negative (i.e., if the aggregation level corresponding to the PDCCH signal is 4 or 8), the second PDCCH descrambler 66, the non-orthogonal signal demodulator 68, and the non-orthogonal signal canceller 70 do not operate, and the desired data signal demodulator/decoder 72 demodulates and decodes the mixed data signal as the desired data signal of the UE 10 (step S16). That is, since a high transmission power is allocated to the UE 10 in NOMA, the UE 10 demodulates and decodes the received data signal as the desired data signal of that UE without using an interference canceller.

If the determination of step S8D is positive (i.e., if the aggregation level corresponding to the PDCCH signal is 1 or 2), the second PDCCH descrambler 66 selects one CCE in step S8, and uses the RNTI of another UE to attempt descrambling of the PDCCH signal candidate at that CCE in step S9.

In this embodiment, in a case where the aggregation level of the UE is higher than a certain value, the process for demodulating or canceling out the data signal of another UE can be omitted, and the processing load of the UE can be reduced.

Third Embodiment

Next, a third embodiment of the present invention will be described. The third embodiment is a modification of the first embodiment. In the third embodiment, the radio transmitter 32 of the base station (FIG. 7) transmits the information indicating the RNTIs of the multiple UEs to be subjected to NOMA, not with an RRC signal, but instead includes, in a PDCCH signal addressed to a UE that is to cancel out interference caused by NOMA, the RNTI of another UE that is a destination of a data signal to be canceled out. In other words, in a PDCCH signal for a first UE, which is the destination of a first data signal that does not have the highest downlink transmission power determined by the downlink transmission power determiner 42, the radio transmitter 32 includes the RNTI of a second UE, which is the destination of a second data signal and is mixed with the first data signal in a mixed data signal. Thus, it is possible for the first UE to descramble the PDCCH signal for the second UE. In this embodiment, to a subject UE that is multiplexed using NOMA and for which the power is low, the radio transmitter 32 performs notification of the RNTI of another UE that belongs to the same group as the subject UE and for which the power is higher than that for the subject UE. The radio transmitter 32 does not transmit, to the first UE, information indicating the radio resources used to transmit the PDCCH signal for the second UE.

Specifically, in allocating the downlink transmission powers shown in FIG. 3, the radio transmitter 32 does not include the RNTI of another UE in the PDCCH signals addressed to the UEs 102 and 105. The radio transmitter 32 includes the RNTI of the UE 102 in the PDCCH signal addressed to the UE 101, and includes the RNTI of the UE 101 in the PDCCH signal addressed to the UE 100. The radio transmitter 32 includes the RNTI of the UE 105 in the PDCCH signal addressed to the UE 104, and includes the RNTI of the UE 104 in the PDCCH signal addressed to the UE 103. The UE 101 can decrypt the PDCCH signal for the UE 102 using the RNTI of the UE 102, and can demodulate the data signal addressed to the UE 102 using the information element included in that PDCCH signal. The UE 104 can decrypt the PDCCH signal for the UE 105 using the RNTI of the UE 105, and can demodulate the data signal addressed to the UE 105 using the information element included in that PDCCH signal. The UE 100 can decrypt the PDCCH signal for the UE 101 using the RNTI of the UE 101, can further decrypt the PDCCH signal for the UE 102 using the RNTI of the UE 102 included therein, and can demodulate the data signal addressed to the UE 102 using the information element included in that PDCCH signal (thereafter, the UE 100 can demodulate the data signal addressed to the UE 101 using the PDCCH signal for the UE 101). The UE 103 can decrypt the PDCCH signal for the UE 104 using the RNTI of the UE 104, can furthermore decrypt the PDCCH signal for the UE 105 using the RNTI of the UE 105 included therein, and can demodulate the data signal addressed to the UE 105 using the information element included in the PDCCH signal (thereafter, the UE 103 can demodulate the data signal addressed to the UE 104 using the PDCCH signal for the UE 104).

In the downlink transmission power allocation as shown in FIG. 4, the radio transmitter 32 does not include the RNTI of another UE in the PDCCH signal addressed to the UE 103. The radio transmitter 32 includes the RNTI of the UE 103 in the PDCCH signal addressed to the LIE 101, and includes the RNTI of the UE 103 in the PDCCH signal addressed to the UE 102. The radio transmitter 32 includes the RNTI of the UE 101 and the RNTI of the UE 102 in the PDCCH signal addressed to the UE 100. The UE 101 and the UE 102 can decrypt the PDCCH signal for the UE 103 using the RNTI of the UE 103, and can demodulate the data signal addressed to the UE 103 using the information element included in that PDCCH signal. The UE 100 can decrypt the PDCCH signal for the UE 101 using the RNTI of the UE 101, can decrypt the PDCCH signal for the UE 102 using the RNTI of the UE 102, can further decrypt the PDCCH signal for the UE 103 using the RNTI of the UE 103 included in those PDCCH signals, and can demodulate the data signal addressed to the UE 103 using the information element included in that PDCCH signal (thereafter, the UE 100 can demodulate the data signal addressed to the UE 101 using the PDCCH signal for the UE 101 and can demodulate the data signal addressed to the UE 102 using the PDCCH signal for the UE 102).

Figure 13:
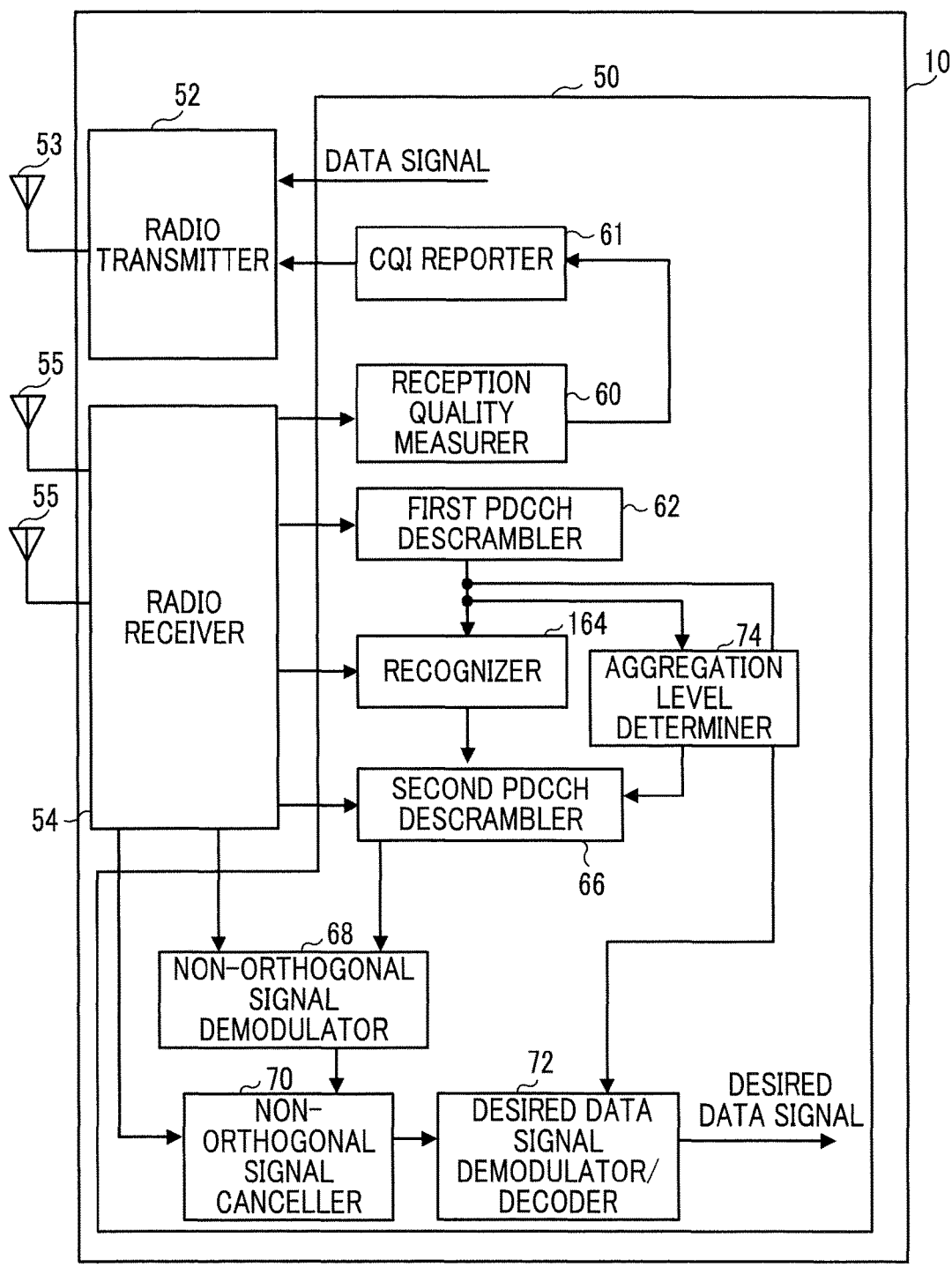
FIG. 13 is a block diagram showing a configuration of a user equipment according to a third embodiment of the present invention.

FIG. 13 is a block diagram showing a configuration of the UE 10 according to the third embodiment. In FIG. 13, the same reference numerals are used to indicate constituent elements that are the same as those in FIG. 9, and such constituent elements will not be described in detail. The controller 50 of the UE 10 includes a recognizer 164. The recognizer 164 is a functional block that is realized due to the controller 50 functioning in accordance with a computer program.

The first PDCCH descrambler 62 descrambles the PDCCH signal corresponding to the UE 10 using the RNTI of the UE 10. Based on the information included in the PDCCH signal that corresponds to the UE 10 and was descrambled by the first PDCCH descrambler 62, the recognizer 164 recognizes the RNTI of at least one another UE, to which at least one orthogonal data signal is addressed, the at least one non-orthogonal data signal being mixed with a desired data signal addressed to the UE 10 in the mixed data signal.

The second PDCCH descrambler 66 descrambles the PDCCH signal corresponding to the other UE using the RNTI of the other UE recognized by the recognizer 164. The second PDCCH descrambler 66, the non-orthogonal signal demodulator 68, and the non-orthogonal signal canceller 70 constitute the interference canceller of the UE. The interference canceller may be SLIC, CWIC, or ML. If the interference canceller is CWIC, the non-orthogonal signal demodulator 68 performs decoding in addition to demodulation of the non-orthogonal data signals.

Figure 14:
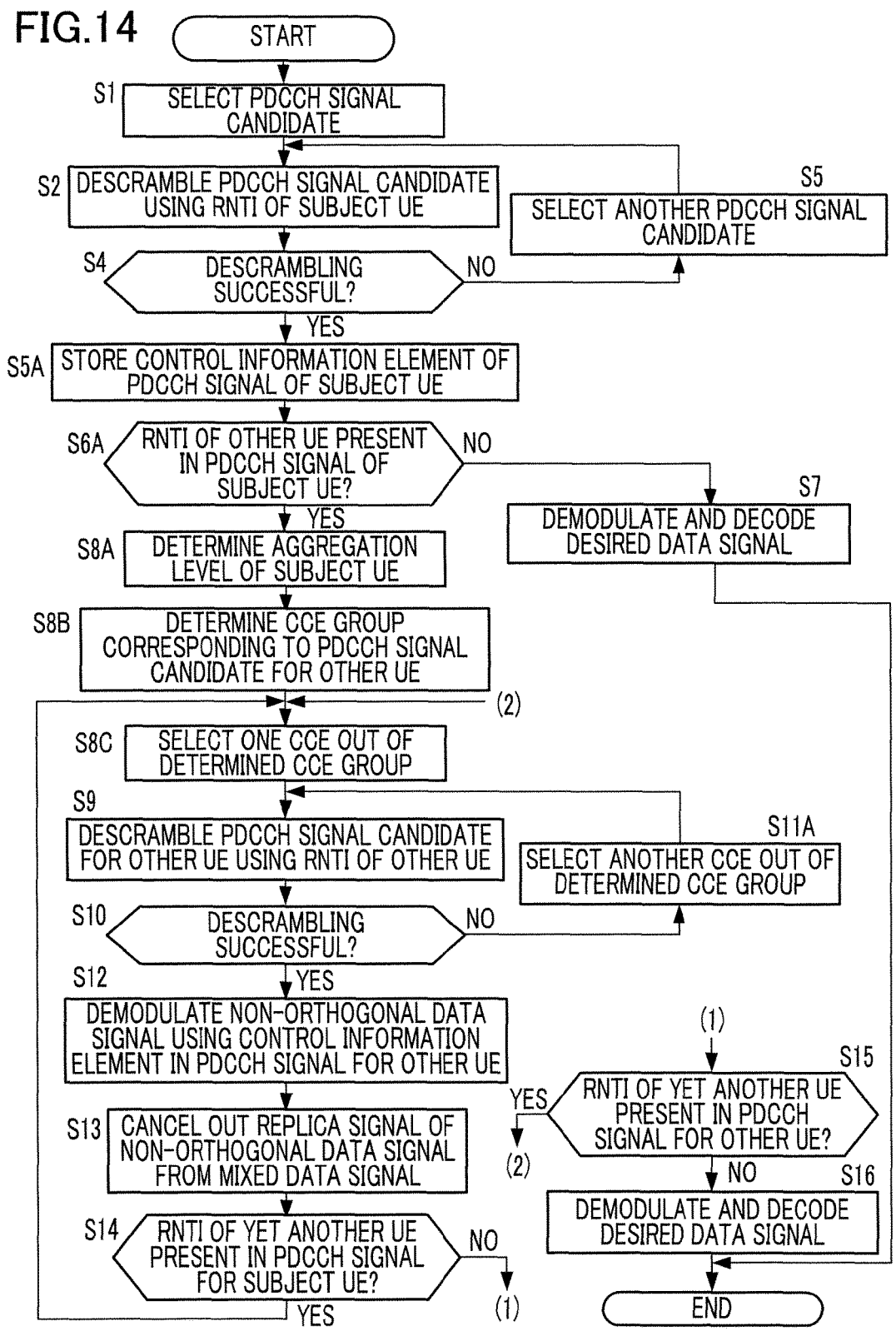
FIG. 14 is a flowchart showing processing executed by the user equipment shown in FIG. 13.

FIG. 14 is a flowchart showing processing executed by the UE 10 shown in FIG. 13. In FIG. 14, the same reference numerals are used to indicate steps that are the same as those in the processing shown in FIGS. 10 and 11, and such steps will not be described in detail.

In step S6A, the recognizer 164 determines whether or not the RNTI of another UE is included in the information included in the descrambled PDCCH signal corresponding to the UE 10.

If the RNTI of another UE is not included in the PDCCH of the UE 10, the second PDCCH descrambler 66, the non-orthogonal signal demodulator 68, and the non-orthogonal signal canceller 70 do not operate, and the desired data signal demodulator/decoder 72 demodulates and decodes the mixed data signal as the desired data signal of the UE 10 (step S7). That is, the UE (e.g., the UE 102 or the UE 105 in the example shown in FIG. 3) to which the highest transmission power is allocated in the groups for NOMA demodulates and decodes the received data signal as the desired data signal of the UE without using the interference canceller.

If the RNTI of another UE is included in the PDCCH of the UE 10, the second PDCCH descrambler 66, and in step SBA, the aggregation level determiner 74 distinguishes the CCEs of a PDCCH signal that corresponds to that UE, and determines an aggregation level that corresponds to that PDCCH signal based on those CCEs. In step S8B, the aggregation level determiner 74 determines a CCE group that corresponds to the PDCCH signal candidate for the other UE based on the aggregation level corresponding to the UE. In step S8C, the second PDCCH descrambler 66 selects one CCE among the CCE group determined in step S8B, and in step S9, the second PDCCH descrambler 66 uses the RNTI of the other UE to attempt descrambling of the PDCCH signal candidate at that CCE.

If the RNTI obtained by descrambling the PDCCH signal candidate for the other UE matches the RNTI of the other UE, that PDCCH signal candidate is the PDCCH signal for the other UE. If it is determined in step S10 that the second PDCCH descrambler 66 did not successfully descramble the PDCCH signal of the other UE (if the RNTI obtained by descrambling the PDCCH signal candidate does not match the RNTI of the other UE recognized in step S6A), the second PDCCH descrambler 66 selects another CCE out of the CCE group determined in step S8B (step S11A) and descrambles the other PDCCH signal candidate (step S9).

If it is determined in step S10 that the second PDCCH descrambler 66 successfully descrambled the PDCCH signal of the other UE (if the RNTI obtained by descrambling the PDCCH signal candidate matches the RNTI of the other UE recognized in step S6A), the PDCCH signal obtained by descrambling is the PDCCH signal corresponding to the other UE that belongs to the same group as the UE 10 and has a higher power allocated thereto, and includes control information elements (see FIG. 5) needed for demodulating the data signal (non-orthogonal data signal) addressed to the other UE. Accordingly, in step S12, the non-orthogonal signal demodulator 68 demodulates the non-orthogonal data signal using those control information elements. Then, in step S13, the non-orthogonal signal canceller 70 cancels out a replica signal that amounts to the non-orthogonal data signal from the mixed data signal.

If the RNTI of another UE is additionally included in the PDCCH signal for the UE 10, the determination of step S14 is positive, and the processing returns to step S8C. If it is determined in step S10 that the descrambling of the PDCCH signal for the other UE was successful, and the PDCCH signal for the other UE further includes the RNTI of another UE, the determination of step S15 is positive, and the processing returns to step S8C.

If there are no more RNTIs of other UEs to be checked (if the determination of step S14 and the determination of step S15 are negative), no interference data signal addressed to another UE that belongs to the same group as the UE 10 and for which the power is higher is overlapped on the desired data signal addressed to the UE 10. In this case, the desired data signal demodulator/decoder 72 uses the PDCCH signal that corresponds to the UE and was descrambled by the first PDCCH descrambler 62 to decode the desired data signal from the signal output from the non-orthogonal signal canceller 70 (step S16).

For example, after the data signal addressed to the UE 102 is canceled out, the determination of step S14 and the determination of step S15 are negative, and the UE 101 shown in FIG. 3 demodulates the data signal addressed to the UE 101. Because the determination of step S15 is positive after the data signal addressed to the UE 102 is canceled out, the UE 100 shown in FIG. 3 further cancels out the data signal addressed to the UE 101 and demodulates the data signal addressed to the UE 100.

For example, because the determination of step S14 is positive after the data signal addressed to the UE 101 is canceled out, the UE 100 shown in FIG. 4 further cancels out the data signal addressed to the UE 102, and after the determination of step S14 becomes negative, demodulates the data signal addressed to the UE 100.

In this embodiment, the search space in which the PDCCH signal of another UE, which is the destination of an interference signal (non-orthogonal data signal) to be canceled out, is searched for based on the aggregation level of the UE can be limited, and the processing load of the UE can be reduced and the PDCCH signal of the other UE can be discovered quickly.

In step S8B, the second PDCCH descrambler 66 may select a CCE that corresponds to an aggregation level higher than the aggregation level corresponding to the UE, or may select a CCE that corresponds to an aggregation level that is higher than or the same as the aggregation level corresponding to the UE. For example, if the aggregation level allocated to the UE is 2, the PDCCH signals with aggregation levels 4 and 8 may be decrypted, and in step S8B, the aggregation level determiner 74 determines the set of CCEs whose indices start at multiples of 4 and 0 as the CCE group corresponding to the PDCCH signal candidates for the other UEs. Accordingly, the second PDCCH descrambler 66 attempts descrambling of the multiple PDCCH signal candidates corresponding to the aggregation levels 4 and 8, which are higher than the aggregation level 2 corresponding to the UE. Alternatively, if the aggregation level allocated to the UE is 2, the PDCCH signal with aggregation level 2 may be decrypted in addition to those with aggregation levels 4 and 8, and in step S8B, the aggregation level determiner 74 determines the set of CCEs whose indices start at multiples of 2 or 0 as the CCE group corresponding to the PDCCH signal candidates for the other UEs. Accordingly, the second PDCCH descrambler 66 attempts descrambling of the multiple PDCCH signal candidates corresponding to the aggregation levels 2, 4, and 8, which are higher than or the same as the aggregation level 2 corresponding to the UE.

Alternatively, if the aggregation level of the UE determined in step S8A is 1 or 2, in step S8B, the aggregation level determiner 74 may determine the set of CCEs whose indices start at multiples of 4 and 0 as the CCE group corresponding to the PDCCH signal candidates for the other UEs. In this case, in step S8C, the CCEs with aggregation levels 4 and 8 are selected, and in step S9, the second PDCCH descrambler 66 attempts descrambling of the PDCCH signal candidate of the other UE at that CCE using the RNTI of the other UE.

If the determination of step S15 is positive (if it is determined in step S10 that the descrambling of the PDCCH signal for the other UE was successful and the PDCCH signal for the other UE further includes the RNTI of another UE), the processing returns to step S8C. Accordingly, in step S8C, the second PDCCH descrambler 66 selects one CCE out of the CCE group determined in step S8B. However, if the decrypting of the PDCCH signal for the other UE is successful in step S10, the CCE thereof is found out, and therefore the aggregation level of the other UE is also found out. Accordingly, if the determination of step S15 is positive, the search space in which the PDCCH signal for yet another UE is searched for may be further limited by determining the aggregation level of the other UE and determining the CCE based on that.

Also, with the base station according to this embodiment, an RNTI (16 bits) of at least one second UE, which is the destination of at least one second data signal mixed with a first data signal in the mixed data signal, is included in a PDCCH signal for a first UE, which is the destination of the first data signal that does not have the highest downlink transmission power, and therefore the first UE can use the RNTI of the second UE to descramble the PDCCH signal for the second UE and demodulate the second data signal, and can cancel out a replica signal that amounts to the second data signal from the mixed data signal. On the other hand, since information indicating the radio resources used in the transmission of the PDCCH signal for the second UE is not transmitted to the first UE, it is possible to suppress an increase in the amount of information for the interference canceller transmitted with the PDCCH signal. Thus, an increase in traffic can be suppressed.

The UE according to this embodiment recognizes the RNTI of at least one other UE based on information included in the PDCCH signal corresponding to the UE 10, uses the RNTI of the other UE to attempt descrambling of one PDCCH signal among multiple PDCCH signals, and if the descrambling is successful, demodulates the non-orthogonal data signal, and cancels out a replica signal that amounts to the non-orthogonal data signal from the mixed data signal. In this manner, even if the radio resources used in the transmission of the PDCCH signal for the other UE are not known, the UE can decrypt the PDCCH signal for the UE by blind decoding, demodulate the non-orthogonal data signal, and cancel out the replica signal, which amounts to the non-orthogonal data signal, from the mixed data signal. Accordingly, the UE contributes to suppressing an increase in the amount of information for the interference canceller transmitted with the PDCCH signal.

While there can be multiple groups of data signals with different transmission powers (there can be multiple groups of UEs) in NOMA, the radio transmitter 32 of the base station according to this embodiment includes the RNTI of a second UE, which is the address of a second data signal that has been mixed with a first data signal in the mixed data signal, in the PDCCH signal for the first UE, which is the destination of a first data signal that does not have the highest downlink transmission power determined by the downlink transmission power determiner 42. Accordingly, the first UE can descramble the PDCCH signal for the second UE. In other words, the radio transmitter 32 notifies a subject UE, which is multiplexed using NOMA and for which the power is low, of the RNTI of a UE that belongs to the same group as the subject UE and for which the power is higher than that for the subject UE. Notification of the RNTI of a UE belonging to another group is not performed.

Also, based on the PDCCH signal corresponding to the UE 10, the UE according to this embodiment recognizes the RNTI of at least one other UE, which is a destination of a non-orthogonal data signal that is mixed with the desired data signal addressed to the UE 10 in the mixed data signal. In other words, the UE recognizes the RNTI of another UE belonging to the same group as the UE 10. Accordingly, the UE uses the RNTI of the other UE to attempt descrambling of one PDCCH signal among multiple PDCCH signals, and if the descrambling is successful (if the determination of step S10 is positive), the descrambled PDCCH signal is the PDCCH signal for the other UE belonging to the same group as the UE 10, and corresponds to a non-orthogonal data signal. For this reason, if the descrambling is successful, the non-orthogonal data signal can be demodulated (step S12), and therefore the processing load of the UE is reduced.

Fourth Embodiment

Next, a fourth embodiment of the present invention will be described. A UE according to the fourth embodiment determines the aggregation level of a PDCCH signal corresponding to that UE based on the PDCCH signal, and if the aggregation level corresponding to that UE is higher than a certain value (e.g., 2 or 4), that UE decodes the desired data signal without canceling out the data signals addressed to the other UEs. For this reason, if the aggregation level corresponding to that UE is higher than a certain value (e.g., 2 or 4), decrypting of the PDCCH signals of the other UEs is not performed, and demodulation of the data signals addressed to the other UEs is not performed.

The block diagram of the UE according to the fourth embodiment is the same as that shown in FIG. 13. However, if the aggregation level that was determined by the aggregation level determiner 74 and that corresponds to the PDCCH signal is higher than a certain value, the second PDCCH descrambler 66, the non-orthogonal signal demodulator 68, and the non-orthogonal signal canceller 70 do not operate, and the desired data signal demodulator/decoder 72 decodes the mixed data signal as the desired data signal.

Processing executed by the UE 10 according to the fourth embodiment will be described with reference to the flowchart in FIG. 15. This processing is similar to the processing shown in FIG. 14, the same reference numerals are used to indicate steps that are the same as those in the processing shown in FIG. 14, and such steps will not be described in detail.

Figure 15:
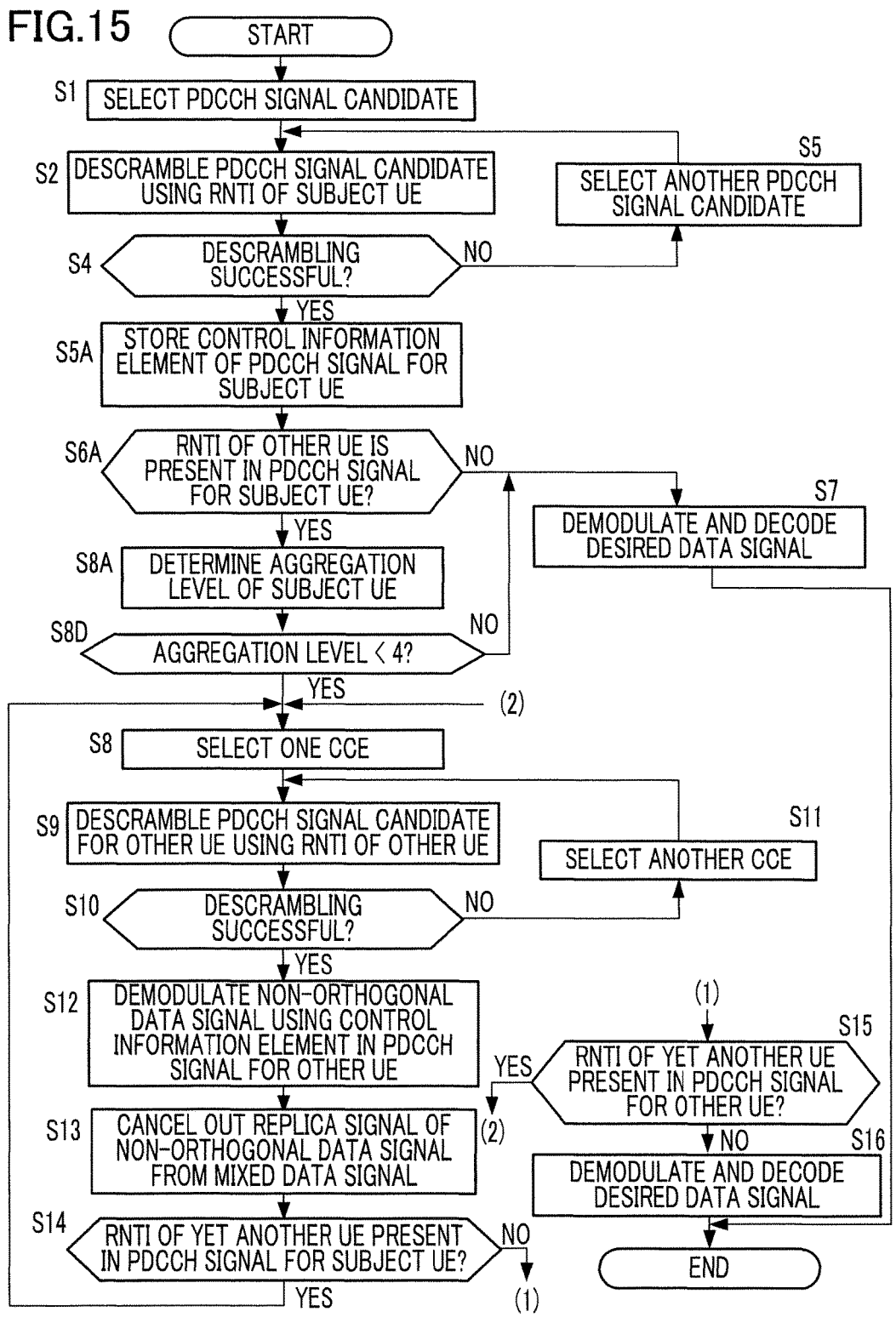
FIG. 15 is a flowchart showing processing executed by a user equipment according to a fourth embodiment of the present invention.

In the processing shown in FIG. 15, if the determination of step S6A is positive (if the RNTI of another UE is included in the PDCCH for the UE 10), in step S8A, the aggregation level determiner 74 distinguishes the CCE of the PDCCH signal corresponding to the UE, and based on the CCE, determines an aggregation level that corresponds to that PDCCH signal.

Also, in step S8D, the aggregation level determiner 74 determines whether or not the aggregation level corresponding to the PDCCH signal is lower than a certain threshold value (e.g., 4). If the determination of step S8D is negative (i.e., if the aggregation level corresponding to the PDCCH signal is 4 or 8), the second PDCCH descrambler 66, the non-orthogonal signal demodulator 68, and the non-orthogonal signal canceller 70 do not operate, and the desired data signal demodulator/decoder 72 demodulates and decodes the mixed data signal as the desired data signal of the UE 10 (step S7). That is, since a high transmission power is allocated to the UE 10 in NOMA, the UE 10 demodulates and decodes the received data signal as the desired data signal of that UE without using an interference canceller.

If the determination of step S8D is positive (i.e., if the aggregation level corresponding to the PDCCH signal is 1 or 2), the second PDCCH descrambler 66 selects one CCE in step S8, and uses the RNTI of another UE to attempt descrambling of the PDCCH signal candidate at that CCE in step S9.

In this embodiment, in the case where the aggregation level of the UE is higher than a certain value, the process for demodulating or canceling out the data signal of another UE can be omitted, and the processing load of the UE can be reduced.

Fifth Embodiment

Next, a fifth embodiment of the present invention will be described. In the third embodiment and the fourth embodiment, a PDCCH signal was used to notify the UE of the RNTI of an interfering UE multiplexed by NOMA. The length of the RNTI is 16 bits, and the period of the PDCCH signal is one subframe (1 ms). However, the amount of information that can be transmitted with a PDCCH signal is limited, and the amount of information is to be suppressed.

Also, transmitting an RNTI in the period of one subframe is not good in terms of transmission efficiency.

In view of this, in the fifth embodiment of the present invention, in a period longer than the period for transmitting the PDCCH signal, the base station notifies multiple UEs subjected to NOMA of a list in which list, multiple RNTIs of multiple UEs and multiple indices each having a length shorter than that of the RNTI are associated in one-to-one relationships with each other, with those multiple UEs being the destinations of multiple data signals that are not orthogonal to each other. In the PDCCH signal for a UE subjected to NOMA, the base station includes indices corresponding to the other UEs that belong to the same group as that UE and have higher powers allocated thereto.

Figure 16:
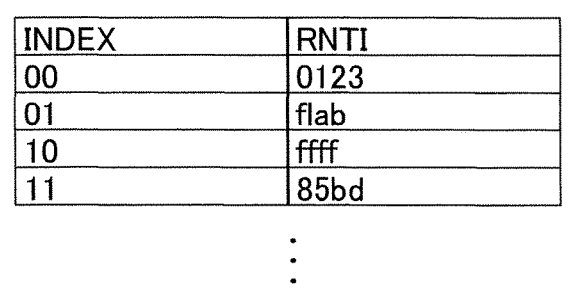

FIG. 16 shows an example of a list to be used in the fifth embodiment Each RNTI is associated in a one-to-one relationship with an index. In contrast to the RNTI having a length of 16 bits, the index has a shorter length. This list contains the RNTIs of the UEs of all groups to which NOMA is to be applied by the base station. Notification of this list may be performed semi-statically to UEs of all groups for which the transmission powers are not the highest through higher layer signaling (RRC (radio resource control) signaling). For example, the period for notification may be 100 ms or 1 s.

In the PDCCH signal for a first UE (UE that is subjected to NOMA and for which the downlink transmission power is not the highest) that is transmitted in a 1-ms period, the radio transmitter 32 (see FIG. 7) of the base station includes an index corresponding to at least one second UE (UE that belongs to the same group as the first UE and for which the downlink transmission power is higher than that for the first UE). Due to the UE receiving the list shown in FIG. 16 in advance, if notification of index 00 is performed with a PDCCH signal, for example, the UE can recognize that the RNTI of the second UE is 0123 based on the index and the list.

The index has a length that is shorter than that of the RNTI, and therefore it is possible to further suppress an increase in the amount of information for an interference canceller transmitted with the PDCCH signal. The list may be compressed using a publicly known data compression technique. An increase in the amount of information transmitted by higher layer signaling can also be suppressed using compression.

Other features may be the same as those in the third embodiment or those in the fourth embodiment. From the base station, in a period (e.g., 100 ms or 1 s) longer than the period for transmitting the PDCCH signal (1 ms), the radio receiver 54 (see FIG. 13) of the UE 10 receives information indicating a list in which multiple RNTIs of multiple UEs, which are the destinations of multiple data signals that are not orthogonal to each other, and multiple indices having lengths shorter than those of the RNTIs are associated in one-to-one relationships with each other. Also, the radio receiver 54 of the UE 10, which is subjected to NOMA and for which the downlink transmission power is not the highest, receives the PDCCH signal for that UE, which includes an index corresponding to at least one other UE.

Other Modifications

The above-described embodiments and modifications may be combined, as long as there are no discrepancies. For example, the first embodiment and the second embodiment may be combined by inserting the determination of step S8D in FIG. 12 between step S8A and step S8B in FIG. 11. The third embodiment and the fourth embodiment may be combined by inserting the determination of step S8D in FIG. 15 between step S8A and step S8B in FIG. 14.

In the first embodiment and the second embodiment, the base station notifies the UE of the identifier information indicating the multiple RNTIs using an RRC signal. In the third, the fourth, and the fifth embodiments, the base station includes the multiple RNTIs of the multiple UEs subjected to NOMA or the information indicating the RNTIs in the PDCCH signals corresponding to the UEs subjected to NOMA. However, the RNTIs may be transmitted to the UE by other means.

In a UE, the functions executed by the CPU may be executed by hardware instead of by the CPU, or may be executed by a programmable logic device such as an FPGA (Field Programmable Gate Array) or a DSP (Digital Signal Processor) instead of by the CPU.

DESCRIPTION OF REFERENCE SIGNS 1 base station
10, 100 to 105 UE
30 controller
32 radio transmitter
33 transmission antenna
34 radio receiver
35 reception antenna
36 inter-base station communicator
38 CQI reporting processor
40 control signal generator
41 scheduler
42 downlink transmission power determiner
43 RRC signal generator
50 controller
52 radio transmitter
53 transmission antenna
54 radio receiver
55 reception antenna
60 reception quality measurer
61 CQI reporter
62 first PDCCH descrambler (first descrambler)
64 recognizer
66 second PDCCH descrambler (second descrambler)
68 non-orthogonal signal demodulator
70 non-orthogonal signal canceller
72 desired data signal demodulator/decoder (desired data signal decoder)
74 aggregation level determiner
64 recognizer

The invention claimed is:
1. A user equipment, comprising:
a radio receiver configured to receive, from a base station, a mixed data signal transmitted in a format in which a plurality of data signals addressed to a plurality of user equipments in a group are transmitted using different downlink transmission powers such that the plurality of data signals are not orthogonal to each other and in which a plurality of data signals addressed to a plurality of user equipments in another group are transmitted using different downlink transmission powers such that the plurality of data signals are not orthogonal to each other, a plurality of control signals corresponding to the plurality of user equipments, and information indicating an identifier of at least one other user equipment, of the plurality of user equipments, that belongs to at least the group to which the subject user equipment belongs;

a first descrambler configured to descramble a control signal for the subject user equipment using an identifier of the subject user equipment;

a recognizer configured to recognize the identifier of the at least one other user equipment, to which at least one non-orthogonal data signal is addressed, the at least one non-orthogonal data signal being mixed with a desired data signal addressed to the subject user equipment in the mixed data signal;

a second descrambler configured to descramble a control signal, of the plurality of control signals, that corresponds to the other user equipment using the identifier of the other user equipment recognized by the recognizer;

a non-orthogonal signal demodulator configured to demodulate the non-orthogonal data signal using the control signal corresponding to the other user equipment and descrambled by the second descrambler;

a non-orthogonal signal canceller configured to cancel out a replica signal that amounts to the non-orthogonal data signal demodulated by the non-orthogonal signal demodulator from the mixed data signal;

a desired data signal decoder configured to decode the desired data signal from a signal output from the non-orthogonal signal canceller, using the control signal corresponding to the subject user equipment and descrambled by the first descrambler; and an aggregation level determiner configured to, based on the control signal corresponding to the subject user equipment, determine an aggregation level that corresponds to that control signal, wherein the second descrambler uses the identifier of the other user equipment to attempt descrambling of one control signal among a plurality of control signals, of the plurality of control signals received by the radio receiver, that corresponds to an aggregation level higher than or the same as the aggregation level corresponding to the subject user equipment, if the descrambling of the control signal by the second descrambler fails, the second descrambler attempts descrambling of another control signal among the plurality of control signals, and if the descrambling of the control signal by the second descrambler is successful, the non-orthogonal signal demodulator demodulates the non-orthogonal data signal using a control signal output from the second descrambler.

2. The user equipment according to claim 1, wherein if the aggregation level corresponding to the subject user equipment is higher than a certain value, the second descrambler, the non-orthogonal signal demodulator, and the non-orthogonal signal canceller do not operate, and the desired data signal decoder decodes the mixed data signal as the desired data signal.

3. A user equipment, comprising:

a radio receiver configured to receive, from a base station, a mixed data signal transmitted in a format in which a plurality of data signals addressed to a plurality of user equipments in a group are transmitted using different downlink transmission powers such that the plurality of data signals are not orthogonal to each other and in which a plurality of data signals addressed to a plurality of user equipments in another group are transmitted using different downlink transmission powers such that the plurality of data signals are not orthogonal to each other, a plurality of control signals corresponding to the plurality of user equipments, and information indicating an identifier of at least one other user equipment, of the plurality of user equipments, that belongs to at least the group to which the subject user equipment belongs;

a first descrambler configured to descramble a control signal for the subject user equipment using an identifier of the subject user equipment;

a recognizer configured to recognize the identifier of the at least one other user equipment, to which at least one non-orthogonal data signal is addressed, the at least one non-orthogonal data signal being mixed with a desired data signal addressed to the subject user equipment in the mixed data signal;

a second descrambler configured to descramble a control signal, of the plurality of control signals, that corresponds to the other user equipment using the identifier of the other user equipment recognized by the recognizer;

a non-orthogonal signal demodulator configured to demodulate the non-orthogonal data signal using the control signal corresponding to the other user equipment and descrambled by the second descrambler;

a non-orthogonal signal canceller configured to cancel out a replica signal that amounts to the non-orthogonal data signal demodulated by the non-orthogonal signal demodulator from the mixed data signal;

a desired data signal decoder configured to decode the desired data signal from a signal output from the non-orthogonal signal canceller, using the control signal corresponding to the subject user equipment and descrambled by the first descrambler; and an aggregation level determiner configured to, based on the control signal corresponding to the subject user equipment, determine an aggregation level that corresponds to that control signal, wherein the second descrambler uses the identifier of the other user equipment to attempt descrambling of one control signal among a plurality of control signals, of the plurality of control signals received by the radio receiver, if the descrambling of the control signal by the second descrambler fails, the second descrambler attempts descrambling of another control signal among the plurality of control signals, if the descrambling of the control signal by the second descrambler is successful, the non-orthogonal signal demodulator demodulates the non-orthogonal data signal using a control signal output from the second descrambler, and if the aggregation level corresponding to the subject user equipment is higher than a certain value, the second descrambler, the non-orthogonal signal demodulator, and the non-orthogonal signal canceller do not operate, and the desired data signal decoder decodes the mixed data signal as the desired data signal.

4. The user equipment according to claim 1, wherein if the descrambling of the control signal by the second descrambler is successful, the non-orthogonal signal demodulator attempts demodulation of the non-orthogonal data signal using the control signal output from the second descrambler, if the demodulation of the non-orthogonal data signal by the non-orthogonal data signal demodulator fails, the second descrambler attempts descrambling of one control signal among the plurality of control signals, of plurality of control signals received by the radio receiver, using yet another identifier, and if the demodulation of the non-orthogonal data signal by the non-orthogonal signal demodulator is successful, the non-orthogonal signal canceller cancels out a replica signal that amounts to the non-orthogonal data signal from the mixed data signal.

5. The user equipment according to claim 2, wherein if the descrambling of the control signal by the second descrambler is successful, the non-orthogonal signal demodulator attempts demodulation of the non-orthogonal data signal using the control signal output from the second descrambler, if the demodulation of the non-orthogonal data signal by the non-orthogonal data signal demodulator fails, the second descrambler attempts descrambling of one control signal among the plurality of control signals, of plurality of control signals received by the radio receiver, using yet another identifier, and if the demodulation of the non-orthogonal data signal by the non-orthogonal signal demodulator is successful, the non-orthogonal signal canceller cancels out a replica signal that amounts to the non-orthogonal data signal from the mixed data signal.

6. The user equipment according to claim 3, wherein if the descrambling of the control signal by the second descrambler is successful, the non-orthogonal signal demodulator attempts demodulation of the non-orthogonal data signal using the control signal output from the second descrambler, if the demodulation of the non-orthogonal data signal by the non-orthogonal data signal demodulator fails, the second descrambler attempts descrambling of one control signal among the plurality of control signals, of plurality of control signals received by the radio receiver, using yet another identifier, and if the demodulation of the non-orthogonal data signal by the non-orthogonal signal demodulator is successful, the non-orthogonal signal canceller cancels out a replica signal that amounts to the non-orthogonal data signal from the mixed data signal.

* * * * *